(12) United States Patent
Kuechler et al.

(10) Patent No.: US 7,678,954 B2
(45) Date of Patent: *Mar. 16, 2010

(54) OLEFIN OLIGOMERIZATION TO PRODUCE HYDROCARBON COMPOSITIONS USEFUL AS FUELS

(75) Inventors: Keith H. Kuechler, Friendswood, TX (US); Stephen Harold Brown, Bernardsville, NJ (US); Helge Jaensch, Ixelles (BE); Georges M. Mathys, Bierbeek (BE); Shifang Luo, Pittsford, NY (US); Jane C. Cheng, Bridgewater, NJ (US)

(73) Assignee: ExxonMobil Chemical Patents, Inc., Houston, TX (US)

( * ) Notice: Subject to any disclaimer, the term of this patent is extended or adjusted under 35 U.S.C. 154(b) by 984 days.

This patent is subject to a terminal disclaimer.

(21) Appl. No.: 11/342,385

(22) Filed: Jan. 27, 2006

(65) Prior Publication Data

US 2006/0217580 A1   Sep. 28, 2006

Related U.S. Application Data

(60) Provisional application No. 60/648,947, filed on Jan. 31, 2005, provisional application No. 60/648,938, filed on Jan. 31, 2005, provisional application No. 60/685,577, filed on May 27, 2005.

(51) Int. Cl.
  *C07C 2/02* (2006.01)

(52) U.S. Cl. ............. 585/533; 585/1; 585/14; 585/312; 585/313; 585/324; 585/502; 585/517; 585/518; 585/520; 585/530; 585/651; 585/653; 502/64; 502/77

(58) Field of Classification Search ............ 585/14, 585/324, 502, 517, 518, 520, 530, 533, 1, 585/312, 313, 651, 653; 502/64, 77
See application file for complete search history.

(56) References Cited

U.S. PATENT DOCUMENTS 3,926,782 A   12/1975   Plank et al.

(Continued)

FOREIGN PATENT DOCUMENTS

EP   0 882 692   12/1998

(Continued)

OTHER PUBLICATIONS

N. Amin, et al., "Dealuminated ZSM-5 Zeolite Catalyst for Ethylene Oligomerization to Liquid Fuels", Journal of Natural Gas Chemistry, vol. 11, pp. 79-86, 2002. (Abstract).

(Continued)

*Primary Examiner*—In Suk Bullock
*Assistant Examiner*—Prem C. Singh
(74) *Attorney, Agent, or Firm*—Kevin M. Faulkner; David M. Weisberg

(57) ABSTRACT

In a process for producing a hydrocarbon composition, a feed comprising at least one $C_3$ to $C_8$ olefin and an olefinic recycle stream rich in $C_9-$ hydrocarbons is contacted with a crystalline molecular sieve catalyst having an average crystal size no greater than 0.05 micron and an alpha value between about 100 and about 600 in at least one reaction zone under olefin oligomerization conditions including an inlet temperature between about 150° C. and about 350° C., a pressure of at least 2,860 kPa and a recycle to feed weight ratio of about 0.1 to about 3.0. The contacting produces an oligomerization effluent stream, which is separated into at least a hydrocarbon product stream rich in $C_9+$ hydrocarbons and the olefinic recycle stream.

21 Claims, 13 Drawing Sheets

U.S. PATENT DOCUMENTS

| | | | |
|---|---|---|---|
| 4,025,575 A | 5/1977 | Chang et al. | |
| 4,211,640 A | 7/1980 | Garwood et al. | |
| 4,263,141 A | 4/1981 | Möller et al. | |
| 4,369,255 A | 1/1983 | Supp | |
| 4,444,988 A | 4/1984 | Capsuto et al. | |
| 4,456,781 A | 6/1984 | Marsh et al. | |
| 4,471,147 A | 9/1984 | Owen et al. | |
| 4,482,772 A | 11/1984 | Tabak | |
| 4,497,968 A | 2/1985 | Wright et al. | |
| 4,504,693 A | 3/1985 | Tabak et al. | |
| 4,543,435 A | 9/1985 | Gould et al. | |
| 4,544,792 A | 10/1985 | Smith et al. | |
| 4,547,612 A | 10/1985 | Tabak | |
| 4,547,616 A | 10/1985 | Avidan et al. | |
| 4,560,536 A | 12/1985 | Tabak | |
| 4,677,243 A | 6/1987 | Kaiser | |
| 4,720,600 A | 1/1988 | Beech, Jr. et al. | |
| 4,740,645 A | 4/1988 | Garwood et al. | |
| 4,777,316 A | 10/1988 | Harandi et al. | |
| 4,788,366 A | 11/1988 | Harandi et al. | |
| 4,822,477 A | 4/1989 | Avidan et al. | |
| 4,831,203 A | 5/1989 | Owen et al. | |
| 4,831,204 A | 5/1989 | Kushnerick et al. | |
| 4,834,949 A | 5/1989 | Owen et al. | |
| 4,851,602 A | 7/1989 | Harandi et al. | |
| 4,855,524 A | 8/1989 | Harandi et al. | |
| 4,859,308 A | 8/1989 | Harandi et al. | |
| 4,868,146 A | 9/1989 | Chu et al. | |
| 4,873,385 A | 10/1989 | Avidan et al. | |
| 4,873,389 A | 10/1989 | Avidan et al. | |
| 4,877,921 A | 10/1989 | Harandi et al. | |
| 4,879,428 A | 11/1989 | Harandi et al. | |
| 4,899,014 A | 2/1990 | Avidan et al. | |
| 4,919,896 A | 4/1990 | Harandi et al. | |
| 4,935,568 A | 6/1990 | Harandi et al. | |
| 4,939,314 A | 7/1990 | Harandi et al. | |
| 4,942,021 A | 7/1990 | Garwood et al. | |
| 4,966,680 A | 10/1990 | Avidan et al. | |
| 5,019,357 A | 5/1991 | Harandi et al. | |
| 5,034,565 A | 7/1991 | Harandi et al. | |
| 5,043,499 A | 8/1991 | Harandi et al. | |
| 5,043,517 A | 8/1991 | Haddad et al. | |
| 5,057,640 A | 10/1991 | Chang et al. | |
| 5,063,187 A | 11/1991 | Burgfels et al. | |
| 5,146,032 A | 9/1992 | Harandi | |
| 5,177,279 A | 1/1993 | Harandi | |
| 5,210,347 A | 5/1993 | Chen et al. | |
| 5,234,875 A | 8/1993 | Han et al. | |
| 6,169,218 B1 | 1/2001 | Hearn et al. | |
| 6,548,721 B1 | 4/2003 | Mc Culloch et al. | |
| 6,673,978 B2 | 1/2004 | Coute' et al. | |
| 6,723,889 B2 | 4/2004 | Miller et al. | |
| 7,253,330 B2 * | 8/2007 | Dakka et al. | 585/533 |
| 2001/0001803 A1 | 5/2001 | Hubbard et al. | |
| 2002/0020107 A1 | 2/2002 | Bailey et al. | |
| 2003/0085153 A1 | 5/2003 | O'Rear | |
| 2003/0116469 A1 | 6/2003 | Hemighaus et al. | |
| 2004/0034261 A1 | 2/2004 | O'Reilly et al. | |
| 2004/0068923 A1 | 4/2004 | O'Rear et al. | |
| 2004/0148850 A1 | 8/2004 | O'Rear et al. | |
| 2004/0149626 A1 | 8/2004 | O'Rear et al. | |
| 2004/0152792 A1 | 8/2004 | O'Rear et al. | |
| 2004/0152930 A1 | 8/2004 | O'Rear et al. | |

FOREIGN PATENT DOCUMENTS

| | | |
|---|---|---|
| EP | 0 916 716 | 5/1999 |
| EP | 1 013 744 | 6/2000 |
| EP | 1 154 009 | 11/2001 |
| EP | 1 249 486 | 10/2002 |
| EP | 1 359 207 | 11/2003 |
| EP | 1 457 546 | 9/2004 |
| WO | WO 00/20534 | 4/2000 |
| WO | WO 00/20535 | 4/2000 |
| WO | WO 01/19762 | 3/2001 |
| WO | WO 01/49812 | 7/2001 |
| WO | WO 01/62875 | 8/2001 |
| WO | WO 02/04575 | 1/2002 |
| WO | WO 02/092731 | 11/2002 |
| WO | WO 03/104361 | 12/2003 |
| WO | WO 2004/16572 | 2/2004 |
| WO | WO 2004/18089 | 3/2004 |
| WO | WO 2004/033512 | 4/2004 |
| WO | WO 2005/003262 | 1/2005 |

OTHER PUBLICATIONS

S. Schwarz et al., "Effect of Silicon-to-Aluminium Ratio and Synthesis Time on High-Pressure Olefin Oligomerization over ZSM-5", Applied Catalysis, vol. 56, pp. 263-280, Dec. 15, 1989.

S. Inagaki, et al., "Influence of nano-particle agglomeration on the catalytic properties of MFI zeolite", Studies in Surface Science and Catalysis, vol. 135, pp. 566-572, 2001.

P. Yarlagadda, et al, "Oligomerization of Ethene and Propene over Composite Zeolite Catalysts", Applied Catalysis, vol. 62, pp. 125-139, Jun. 20, 1990.

M. Yamamura et al., "Synthesis of ZSM-5 zeolite with small crystal size and its catalytic performance for ethylene oligomerization", Zeolites, vol. 14, pp. 643-649, Nov.-Dec. 1994.

Weekman, V. Jr.; "A Model of Catalytic Cracking Conversion in Fixed, Moving, and Fluid-Bed Reactors," Applied Research & Development Division, vol. 7, No. 1, pp. 90-95, 1968.

Pivovarov, A. T. et al.; "Control Parameters for Catalytic Cracking," UDC No. 66.012.52: 542.97, pp. 317-320.

Lee J.S.; et al.; "Effects of Space Velocity on Methanol Synthesis from $CO_2/Co/H_2$ over $Cu/ZnO/Al_2O_3$ Catalyst," Korean J. Chem. Eng, vol. 17, pp. 332-336, 2000.

Fürcht, A., et al.; "N-Octane Reforming: Conversion and Selectivity Dependence on Space Velocity," React. Kinet. Catal. Lett., vol. 72, No. 2, pp. 269-275, 2001.

Hengstebeck, R.J., "Polymerization and Alkylation," Petroleum Processing, Principles and Applications, pp. 208-218, 1959.

Lu Wen-Zhi, et al.; "Theoretical Analysis of Fluidized-Bed Reactor for Dimethyl Ether Synthesis from Syngas," International Journal of Chemical Reactor Engineering, vol. 1, pp. 1-10, 2003.

* cited by examiner

OLEFIN OLIGOMERIZATION TO PRODUCE HYDROCARBON COMPOSITIONS USEFUL AS FUELS

CROSS REFERENCE TO RELATED APPLICATIONS

This application claims the benefit of U.S. Provisional Application 60/648,947, filed Jan. 31, 2005; U.S. Provisional Application No. 60/648,938, filed Jan. 31, 2005; and U.S. Provisional Application No. 60/685,577, filed May 27, 2005, all of which are fully incorporated herein by reference. The present application is related by subject matter to co-pending U.S. patent application Ser. No. 11/342,374, filed Jan. 27, 2006; U.S. patent application Ser. No. 11/342,000, filed Jan. 27, 2006; U.S. patent application Ser. No. 11/342,386, filed Jan. 27, 2006; and U.S. patent application Ser. No. 11/342,365, filed Jan. 27, 2006.

FIELD OF THE INVENTION

This invention relates to an olefin oligomerization process for producing hydrocarbon compositions useful as fuels, such as jet fuel and diesel fuel.

BACKGROUND OF THE INVENTION

Improved hydrocarbon compositions are needed to help meet the growing demand for middle distillate products, such as aviation turbine fuels, for example, JP-8, and diesel fuel. Diesel feel generally provides a higher energy efficiency in compression ignition engines than automotive gasoline provides in spark combustion engines, and has a higher rate of demand growth than automotive gasoline, especially outside the U.S. Further, improved fuel compositions are needed to meet the stringent quality specifications for aviation fuel and the ever tightening quality specifications for diesel fuel as established by industry requirements and governmental regulations.

One known route for producing hydrocarbon compositions useful as fuels is the oligomerization of olefins over various molecular sieve catalysts. Exemplary patents relating to olefin oligomerization include U.S. Pat. Nos. 4,444,988; 4,456,781; 4,504,693; 4,547,612 and 4,879,428. In these disclosures, feedstock olefins are mixed with an olefinic recycle material and contacted with a zeolite, particularly in a series of fixed bed reactors. The oligomerized reaction product is then separated to provide a distillate stream, and typically a gasoline stream, and any number of olefinic recycle streams.

However, in these known oligomerization processes, the focus is on producing relatively heavy distillate products, and even lube base stocks. To enable the production of relatively heavy materials, the processes employ, either directly or indirectly, a relatively large amount of olefinic recycle (typically >2:1 w/w relative to feed), containing significant quantities of $C_{10}$+ material. The relatively large recycle rate provides control over the exotherm of the oligomerization reaction in the preferred fixed bed, adiabatic reactor system, while the relatively heavy recycle composition (in conjunction with high conversion of light olefin feed, in part enabled by a relatively low WHSV) enables the growth of heavier oligomers and thus higher molecular weight and denser distillate product. However, the high rate of recycle requires much larger equipment to handle the increased volumetric flow rate, and uses more separation/fractionation energy, and hence more and larger associated energy conservation elements. Further, the high molecular weight of the oligomer product requires very high temperatures for the fractionation tower bottoms streams that may eliminate the use of simple steam reboilers and require more expensive and complex fired heaters.

The recycle streams in conventional olefin oligomerization processes are produced in a variety of fashions, typically including some sort of single stage flash drum providing a very crude separation of reactor product as a means of providing the relatively heavy components, followed by various fractionation schemes which may or may not provide sharper separations, and again often provide heavy components as recycle. The dense distillate product is generally characterized by a relatively high specific gravity (in excess of 0.775) and a high viscosity, in part due to the composition comprising relatively high levels of aromatics and naphthenes.

Very few references discuss both the merits and methods of producing lighter distillate products, typified by such as jet fuel, kerosene and No. 1 Diesel, via the oligomerization of $C_3$ to $C_8$ olefins. Jet/kero is generally overlooked as a particularly useful middle distillate product, inasmuch as the volume consumed in the marketplace is considerably smaller than its heavier cousins, No. 2 Diesel and No. 4 Diesel (fuel oil). However, jet/kero is a high volume commercial product in its own right, and is also typically suitable as a particular light grade of diesel, called No. 1 Diesel, that is especially useful in colder climates given its tendency to remain liquid and sustain volatility at much lower temperatures. In addition, jet/kero type streams are often blended with other stocks to produce No. 2 Diesel, both to modify the diesel fuel characteristics, and to allow introduction of otherwise less valuable blendstocks into the final higher value product.

U.S. Pat. No. 4,720,600 discloses an oligomerization process for converting lower olefins to distillate hydrocarbons, especially useful as high quality jet or diesel fuels, wherein an olefinic feedstock is reacted over a shape selective acid zeolite, such as ZSM-5, to oligomerize feedstock olefins and further convert recycled hydrocarbons. The reactor effluent is fractionated to recover a middle distillate range product stream and to obtain light and heavy hydrocarbon streams for recycle. The middle distillate product has a boiling range of about 165° C. to 290° C. and contains substantially linear $C_9$ to $C_{16}$ mono-olefinic hydrocarbons, whereas the major portion of the $C_6$ to $C_8$ hydrocarbon components are contained in the lower boiling recycle stream, and the major portion (e.g. 50 wt. % to more than 90 wt. %) of the $C_{16}^+$ hydrocarbon components are contained in the heavy recycle fraction.

U.S. Pat. No. 4,788,366 discloses a multi-stage process for upgrading an ethene-rich feed into heavier hydrocarbon products boiling in the lubricant, distillate and gasoline ranges. The process involves initially contacting the ethene-rich feed in a primary reaction stage with a fluidized bed of a zeolite catalyst, such as ZSM-5, and then separating the resultant effluent into at least a liquid stream containing a major amount of aromatics-rich $C_5$+ hydrocarbons and a gas stream rich in propene and butene. The gas stream is then fed to a secondary reaction stage comprising a series of fixed bed reactors containing a medium pore zeolite oligomerization catalyst, such as ZSM-5, ZSM-11, ZSM-12, ZSM-22, ZSM-23 or ZSM-35, preferably having a silica/alumina molar ratio of 20 to 200 and a crystal size of 0.2 to 1 micron. In the secondary reaction stage, at least part of the aromatics-rich, liquid primary stage effluent is mixed with a hot inter-stage stream containing partially upgraded olefins to quench said inter-stage stream and the resultant mixed stream is passed to at least one downstream oligomerization reactor. The conditions in the secondary reaction stage can be varied to control the product slate, but generally include a temperature of 235° C. to 315° C., a pressure of 2800 to 10,000 kPa and a weight hourly space velocity of 0.1 to 1.5. The product necessarily contains a significant quantity of aromatic hydrocarbons.

A similar process is described in U.S. Pat. No. 4,855,524, in which an olefin-containing light gas or light naphtha is oligomerized to a $C_{10}+$ aliphatic hydrocarbon product in multistage reaction zones. In particular, lower alkenes in the feed are oligomerized to intermediate range olefins, mainly in the $C_5$ to $C_9$ range, in a low severity primary reaction zone containing zeolite catalyst particles, preferably in the form of a fluidized bed. The primary reaction zone effluent is then separated into a $C_4-$ light gas stream and a predominantly olefinic $C_5+$ intermediate stream substantially free of $C_4-$ components. The intermediate stream is then contacted with a medium pore, shape selective, acid oligomerization catalyst in a secondary reaction zone under oligomerization conditions to produce a predominantly $C_{10}+$ product. To maximize the yield of distillate product, the '524 patent teaches that $C_{10}+$ hydrocarbons should be removed from said intermediate stream before passage through said secondary reaction zone and that said secondary reaction zone should be operated with catalyst having an average activity alpha greater than 10, at weight hourly space velocity (WHSV) in the range from about 0.1 to about 10 $hr^{-1}$, at an inlet pressure in excess of about 3200 kPa, an inlet temperature in the range from about 149° C. to about 232° C. and an outlet temperature in the range from about 232° C. to about 343° C. The overall yield and/or quality of the distillate may be further increased by recycling an insufficiently oligomerized portion of the product stream to the secondary reaction zone.

In accordance with the known olefin conversion and oligomerization processes, catalysts are specified that have certain characteristics conducive to their desired products, typically aromatics and heavier distillate products, even lube base stocks. Such characteristics of these known catalysts are not necessarily conducive to the production of lighter distillate products, for example, relatively large crystal size to constrain the larger molecules to enable oligomerization, and relatively high activity to increase the rate of reaction of the less reactive larger molecules. Further, such catalyst attributes in conjunction with the known process conditions favor the production of byproduct cyclics, e.g., aromatics, which are known to be detrimental to distillate and aviation fuel properties.

According to the present invention, it has now been found that by controlling the conditions of the oligomerization process and the properties of oligomerization catalyst, $C_3$ to $C_8$ olefins can be converted into a hydrocarbon composition similar in make-up to that of conventional lighter diesel and jet fuel, making it an excellent blending stock to produce fuel products, such as Jet Fuel A and No. 1 and No. 2 Diesel. The resultant product is also essentially free of aromatic hydrocarbons.

SUMMARY OF THE INVENTION

In one aspect, the present invention resides in a process for producing a hydrocarbon product, the process comprising (a) contacting a feed comprising at least one $C_3$ to $C_8$ olefin and an olefinic recycle stream rich in $C_9-$ hydrocarbons with a crystalline molecular sieve catalyst having an average crystal size no greater than 0.15 micron and an alpha value between about 100 and about 600 in at least one reaction zone under olefin oligomerization conditions including an inlet temperature between about 180° C. and about 350° C., a pressure of at least 2,860 kPa and a recycle to feed weight ratio of about 0.1 to about 3.0, said contacting producing a oligomerization effluent stream; and (b) separating said oligomerization effluent stream into at least a hydrocarbon product stream rich in $C_9+$ hydrocarbons and said olefinic recycle stream.

Conveniently, said feed comprises a mixture of $C_3$ to $C_5$ olefins comprising at least 5 wt. % of $C_4$ olefin, preferably at least 40 wt. % of $C_4$ olefin and at least 10 wt. % of $C_5$ olefin. Where the feed contains $C_4$ olefin, the contacting (a) is conveniently conducted so as to convert about 80 wt. % to about 99 wt. % of the $C_4$ olefin in the feed.

In other embodiments, the crystalline molecular sieve catalyst has an average crystal size no greater than 0.12, 0.10, 0.07, or 0.05 micron. Further, the crystalline molecular sieve catalyst can have an alpha value between about 200 and about 400, or between about 250 and about 350.

In certain manifestations, the crystalline molecular sieve catalyst comprises an aluminosilicate having a silica to alumina ratio from about 20 to about 300, particularly from about 30 to about 200, more specifically from about 50 to about 150.

Conveniently, the recycle to feed weight ratio in said contacting (a) is about 0.5 to about 2.0, or about 0.7 to about 1.3.

Conveniently, the contacting (a) is conducted at a WHSV of at least 1.5, and preferably from about 1.8 to about 9, based on the olefin in the feed. Conveniently, the contacting (a) is conducted at a WHSV of about 2.3 to about 14 based on the olefin in the combined feed and olefinic recycle stream.

Conveniently, the difference between the highest and lowest temperatures within said at least one reaction zone is 40° F. (22° C.) or less.

Conveniently, the contacting (a) is conducted in a plurality of reaction zones connected in series.

Conveniently, said catalyst comprises a molecular sieve having a Constraint Index of about 1 to about 12, such as ZSM-5, ZSM-12, ZSM-22, ZSM-57 or MCM-22, preferably ZSM-5.

Conveniently, said olefinic recycle stream contains no more than 10 wt. %, preferably no more than 7 wt. %, of $C_{10}+$ non-normal olefins. Typically, said olefinic recycle stream contains no more than 30 wt. % of $C_9+$ non-normal olefins. In one embodiment, said olefinic recycle stream has a final boiling point of no greater than 340° F. (170° C.).

Conveniently, the hydrocarbon product stream contains between about 1 wt. % and about 30 wt. %, preferably between about 3 wt. % and about 25 wt. %, of $C_9$ non-normal olefins. Typically, the hydrocarbon product stream comprises no more than 15 wt. % of $C_{17}$ to $C_{20}$ hydrocarbons and in one embodiment comprises between about 0.5 wt. % and about 12 wt. % of $C_{17}$ to $C_{20}$ hydrocarbons. The $C_{17}$ to $C_{20}$ hydrocarbons can be non-normal olefins.

In one embodiment, said hydrocarbon product stream has an initial boiling point of at least 260° F. (127° C.).

In another embodiment, said hydrocarbon product stream comprises at least 90 wt. % of $C_9$ to $C_{20}$ non-normal olefins, non-normal saturates, or combinations thereof.

Conveniently, the process additionally comprises contacting said hydrocarbon product stream with hydrogen to at least partially saturate the olefins contained therein.

DETAILED DESCRIPTION OF THE EMBODIMENTS

Figure 1:
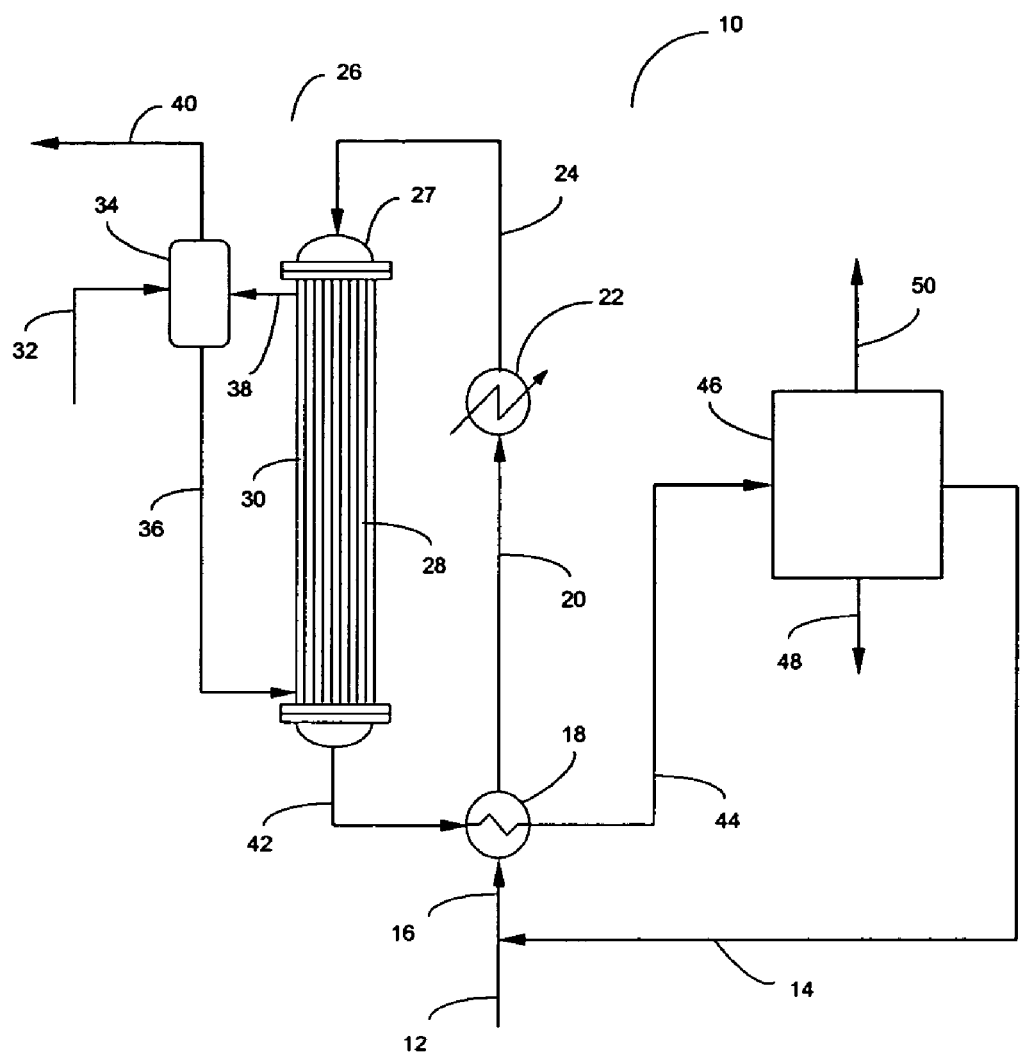
FIG. 1 is a flow diagram of a process for producing a hydrocarbon composition according to one example of the invention.
Figure 2:
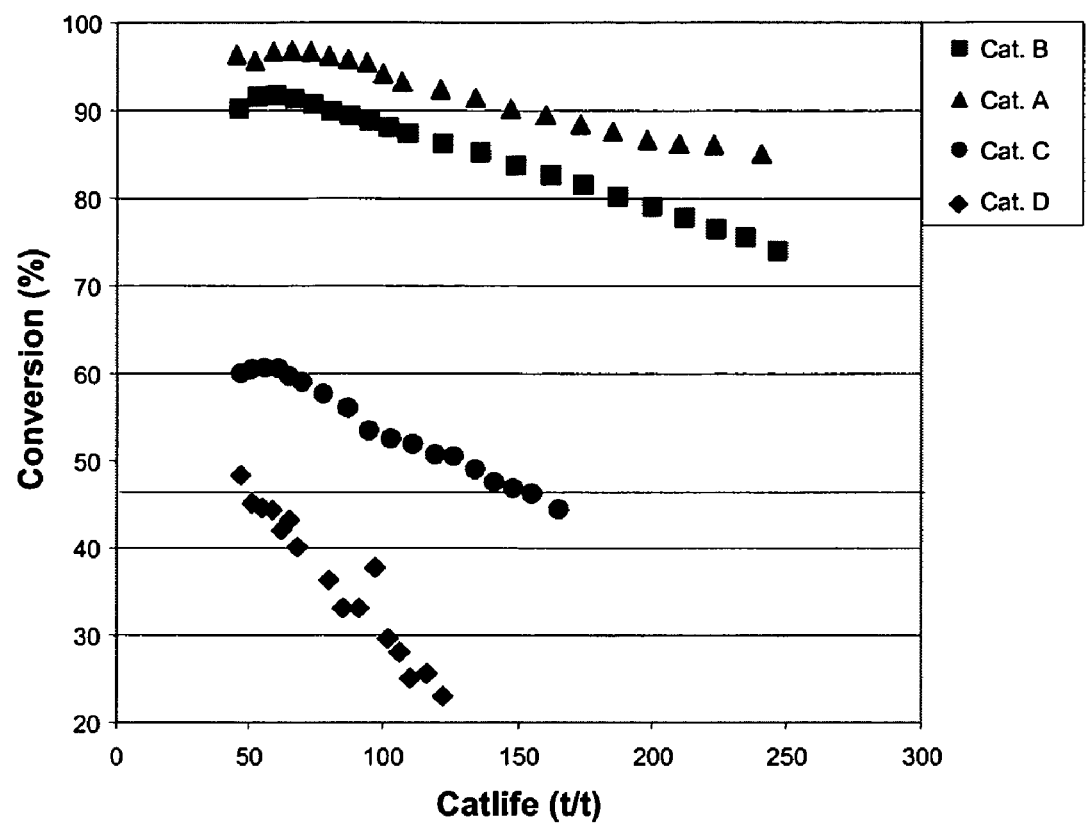
FIG. 2 is a graph of percentage conversion against time on stream for the ZSM-5 catalysts A to D of Example 1.
Figure 3:
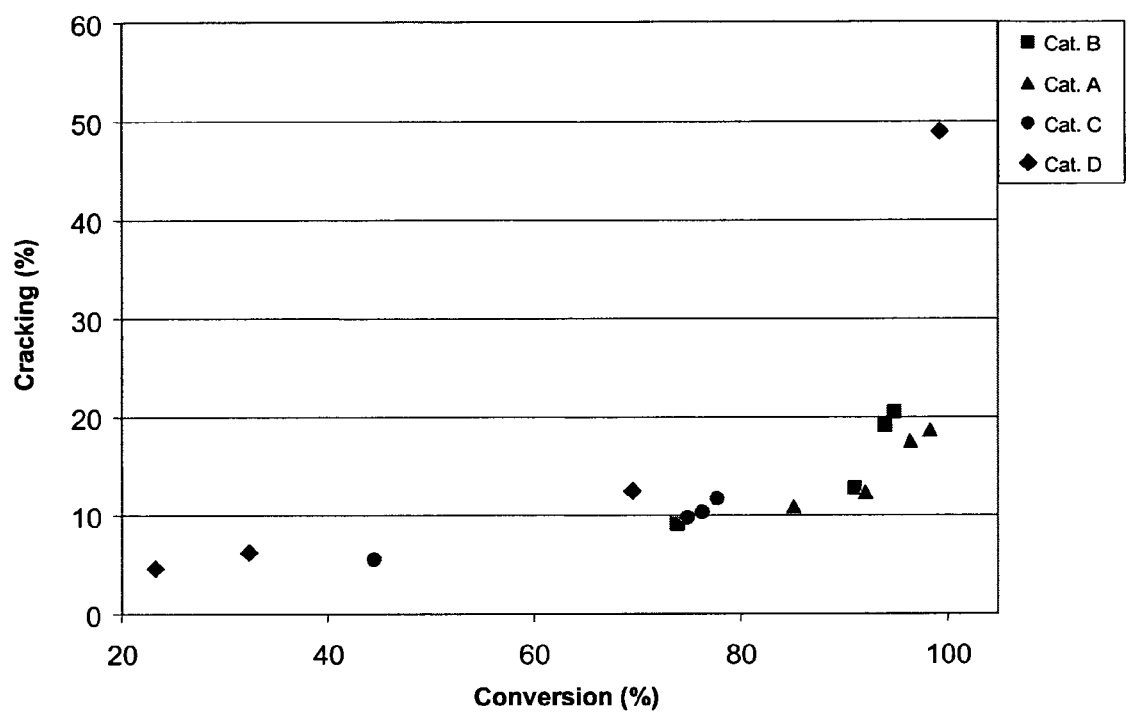
FIG. 3 is a graph of percentage carbon number interconversion (sum of C5+C6+C7+C9+C10+C11+C13+C14+C15) against percentage conversion for the ZSM-5 catalysts A to D of Example 1.
Figure 4:
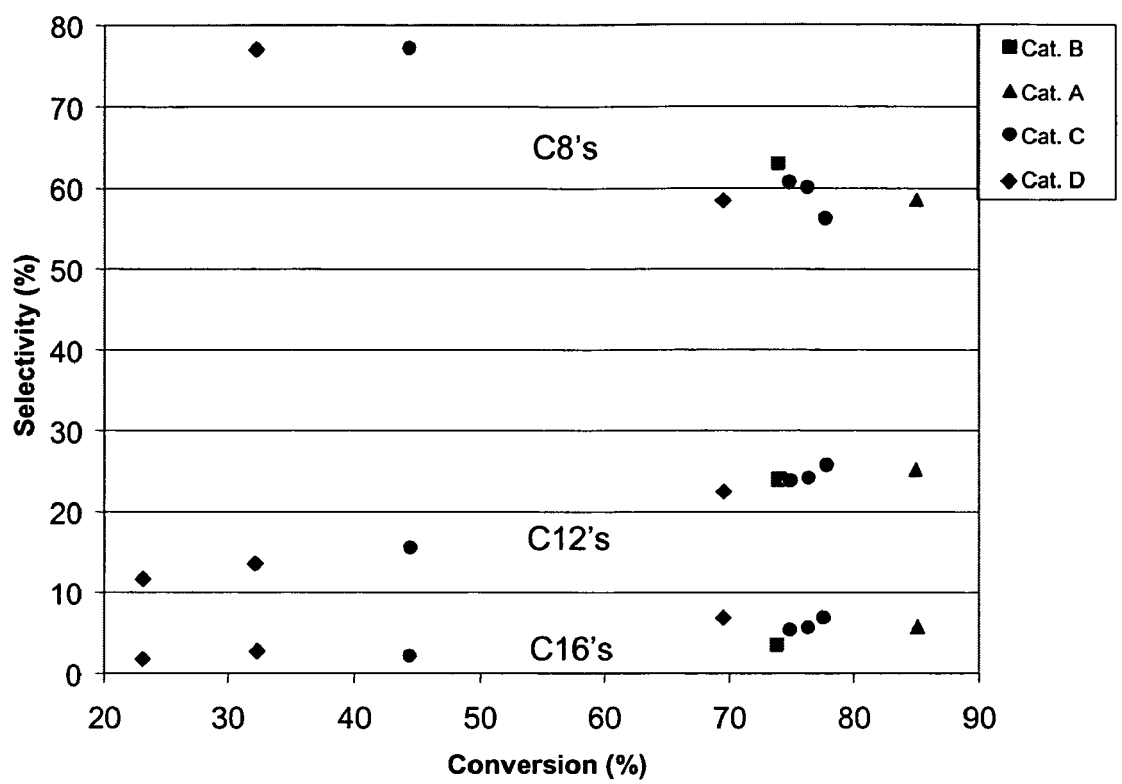
FIG. 4 is a graph of selectivity to $C_8$, $C_{12}$ and $C_{16}$+ hydrocarbons against percentage conversion for the ZSM-5 catalysts A to D of Example 1.
Figure 5:
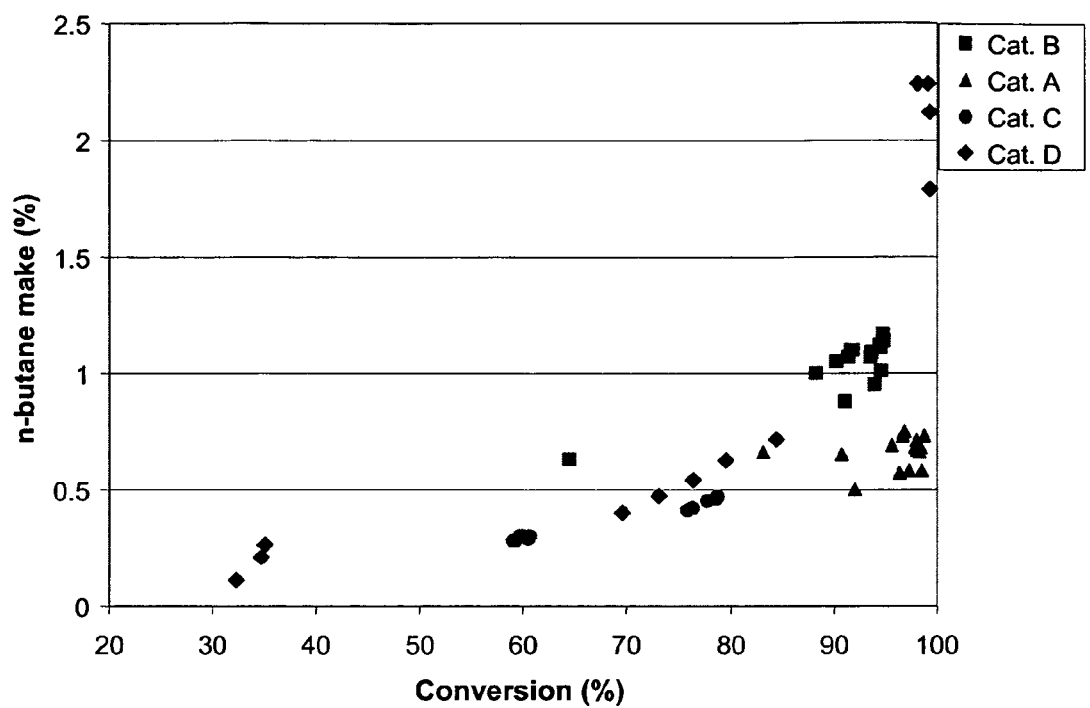
FIG. 5 is a graph of selectivity to n-butane against percentage conversion for the ZSM-5 catalysts A to D of Example 1.

As used herein, the term "$C_x$ hydrocarbon" indicates hydrocarbon molecules having the number of carbon atoms represented by the subscript "x". The term "$C_x$+ hydrocarbons" indicates those molecules noted above having the number of carbon atoms represented by the subscript "x" or greater. For example, "$C_{10}$+ hydrocarbons" would include $C_{10}$, $C_{11}$ and higher carbon number hydrocarbons. Similarly "$C_x$- hydrocarbons" indicates those molecules noted above having the number of carbon atoms represented by the subscript "x" or fewer.

Weight Hourly Space Velocity (WHSV) values cited herein are based on the amount of the molecular sieve contained in the olefin oligomerization catalysts without allowing for any binder or matrix that may also be present in the catalyst.

Distillation temperature values cited herein, including initial boiling point and final boiling point (or end point) refer to measurements made in accordance with ASTM Test Method D86, the entire contents of which test are incorporated herein by reference.

The present invention provides a process for oligomerizing a feed containing at least one $C_3$ to $C_8$ olefin together with a $C_9$- rich olefinic recycle stream over a molecular sieve catalyst having an average crystal size no greater than 0.15 micron and an alpha value between about 100 and about 600. The oligomerization process is conducted in at least one reaction zone under olefin oligomerization conditions including an input temperature between about 180° C. and about 350° C., a pressure of at least 2,860 kPa and a recycle to feed weight ratio of about 0.1 to about 3.0. The oligomerization effluent is then separated into a $C_9$+ rich hydrocarbon product stream and at least one light olefinic stream. At least part of the light olefinic stream(s) is recycled to the oligomerization process.

The hydrocarbon product stream is useful as blending stock to produce fuel products, such as Jet Fuel A and No. 1 and No. 2 Diesel. If desired, at least part of the hydrocarbon product stream can be hydrogenated to at least partially saturate the olefins contained therein.

Oligomerization Feed

The fresh feed to the oligomerization process can include any single $C_3$ to $C_8$ olefin or any mixture thereof in any proportion. Particularly suitable feeds include mixtures of propylene and butylenes having at least 5 wt. %, such as at least 10 wt. %, for example at least 20 wt. %, such as at least 30 wt. % or at least 40 wt. % $C_4$ olefin. Also useful are mixtures of $C_3$ to $C_5$ olefins having at least 40 wt. % $C_4$ olefin and at least 10 wt. % $C_5$ olefin.

Conveniently, the feed should contain no more than about 1.0 wt. %, or even no more than 0.1 wt. % of $C_2$- hydrocarbons, since ethylene is less reactive in the present process than other light olefins, and thus requires substantially more processing to obtain a good ultimate conversion. Further, ethylene and light saturates, such as ethane and methane, are highly volatile, and it will require much more work to recover them in the separation system, likely necessitating the use of expensive and complicated refrigeration systems. It is also of benefit to limit the amount of C10+ hydrocarbons, of any kind, in the feed, to say no more than about 10 wt %, or no more than 5 wt. % or even no more than 1 wt. %, since $C_9$ hydrocarbons are useful components of the hydrocarbon product stream and so it is counter-productive to subject them to the oligomerization process of the invention.

It is also desirable to limit the amount of saturates in the feed, since saturates are not converted in the oligomerization step and tend to accumulate in the recycle stream, thereby reducing the light olefin content of the recycle stream. The amount of non-olefins, especially saturates, in the feed should be less than 45 wt. %, such as less than 35 wt. %, for example less than 25 wt. %, typically less than 15 wt. %, or less than 10 wt. % or even less than 5 wt. %.

In one embodiment, the olefinic feed is obtained by the conversion of an oxygenate, such as methanol, to olefins over a silicoaluminophosphate (SAPO) catalyst, according to the method of, for example, U.S. Pat. Nos. 4,677,243 and 6,673, 978, or an aluminosilicate catalyst, according to the method of, for example, WO04/18089, WO04/16572, EP 0 882 692 and U.S. Pat. No. 4,025,575. Alternatively, the olefinic feed can be obtained by the catalytic cracking of relatively heavy petroleum fractions, or by the pyrolysis of various hydrocarbon streams, ranging from ethane to naphtha to heavy fuel oils, in admixture with steam, in a well understood process known as "steam cracking".

As stated above, the feed to the oligomerization process also contains an olefinic recycle stream that is rich in $C_9$- hydrocarbons and typically contains no more than 10 wt. % of $C_{10}$+ non-olefins. Generally, the olefinic recycle stream should contain no greater than 7.0 wt. %, for example no greater than 5.0 wt. %, such as no greater than 2.0 wt. %, or no greater than 1.0 wt. % or even 0.1 wt. % of non-$C_{10}$+ olefins. Alternatively, the final boiling point temperature of the olefinic recycle stream should be no greater than 340° F. (170° C.), such as no greater than 320° F. (160° C.), for example no greater than 310° F. (155° C.), or even no greater than 305° F. (150° C.). In one embodiment, the olefinic recycle stream contains no greater than 30.0 wt. %, such as no greater than 25.0 wt. %, for example no greater than 20.0 wt. %, or no greater than 15.0 wt. %, or no greater than 10.0 wt. % of $C_9$+ olefin. Alternatively, the final boiling point temperature of the olefinic recycle stream should be no greater than 290° F. (140° C.), such as no greater than 275° F. (135° C.), for example no greater than 260° F. (130° C.).

In one embodiment, the olefinic recycle stream contains no greater than 30 wt. %, or no greater than 25 wt. %, or no greater than 20 wt. %, or no greater than 10 wt. %, or no greater than 5 wt. % $C_4$ hydrocarbons (of any species). This can be achieved by, for example, employing an additional separation of all or a portion of the olefinic recycle stream generated by a separation device into one stream comprising $C_4$– with only a small amount of $C_5$+ hydrocarbons, and a second debutanized stream as all or a portion of the olefinic recycle stream provided to the oligomerization reactor.

The amount of olefinic recycle stream fed to the oligomerization process is such that the recycle to fresh feed weight ratio is from about 0.5 to about 2.0. More particularly, the mass ratio of olefinic recycle stream to fresh olefinic feedstock can be at least 0.7 or at least 0.9, but generally is no greater than 1.8, or no greater than 1.5 or no greater than 1.3.

Oligomerization Catalyst

The catalyst used in the oligomerization process of the invention comprises a crystalline aluminosilicate molecular sieve catalyst having an average ($d_{50}$) crystal size no greater than 0.15 micron, such as no greater than 0.12, 0.10, 0.07 or 0.05 micron, or such as about 0.01 to about 0.10 micron, about 0.02 to about 0.08 micron, or about 0.02 to about 0.05 micron. In addition, the molecular sieve is selected so as to have an alpha value between about 100 and about 600, conveniently between about 200 and about 400, or between about 250 and about 350. The alpha value of a molecular sieve is an approximate indication of its catalytic cracking activity compared with a standard silica-alumina catalyst test (with an alpha value of 1). The alpha test is described in U.S. Pat. No. 3,354,078; in the *Journal of Catalysis*, Vol. 4, p. 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the *Journal of Catalysis*, Vol. 61, p. 395.

Conveniently the oligomerization catalyst used in the process of the invention comprises a crystalline aluminosilicate molecular sieve having a silica to alumina molar ratio of about 20 to about 300, preferably about 30 to about 200, or even about 50 to about 150.

In one embodiment, the catalyst includes a medium pore size molecular sieve having a Constraint Index of about 1 to about 12. Constraint Index and a method of its determination are described in U.S. Pat. No. 4,016,218, which is incorporated herein by reference. Examples of suitable medium pore size molecular sieves are those having 10-membered ring pore openings and include those of the TON framework type (for example, ZSM-22, ISI-1, Theta-1, Nu-10, and KZ-2), those of the MTT framework type (for example, ZSM-23 and KZ-1), of the MFI structure type (for example, ZSM-5), of the MFS framework type (for example, ZSM-57), of the MEL framework type (for example, ZSM-11), of the MTW framework type (for example, ZSM-12), of the EUO framework type (for example, EU-1) and members of the ferrierite family (for example, ZSM-35).

Other examples of suitable molecular sieves include those having 12-membered pore openings, such as ZSM-18, zeolite beta, faujasites, zeolite L, mordenites, as well as members of MCM-22 family of molecular sieves (including, for example, MCM-22, PSH-3, SSZ-25, ERB-1, ITQ-1, ITQ-2, MCM-36, MCM-49 and MCM-56).

Silica to alumina ratio, alpha and crystal size and homogeneity of aluminosilicate compositions are known to vary with the nature of the reaction mixtures and crystallization conditions employed in their synthesis. Exemplary compositions useful in the present invention may be found, for example, in U.S. Pat. No. 4,452,769 describing a method to produce ZSM-12, and in U.S. Pat. Nos. 4,439,409, 4,956,514, and 5,107,047 describing methods to produce MCM-22 and related materials.

In one preferred embodiment, the molecular sieve catalyst comprises ZSM-5. Suitable methods to produce ZSM-5 useful in the present invention are exemplified in U.S. Pat. Nos. 3,926,782, 5,369,071 and 6,180,550, specifically directed to producing crystals with a crystal size less than 0.15 micron, and significantly less than 0.15 as desired. Methods are also known to control ZSM-5 crystal morphology, e.g., geometry and size homogeneity, such as disclosed in European Patent Application 0 093 519 and U.S. Pat. Nos. 4,526,879 and 5,063,187. These references also provide information on the control of silica to alumina ratio and alpha properties.

The molecular sieve may be supported or unsupported, for example in powder form, or used as an extrudate with an appropriate binder. Where a binder is employed, the binder is conveniently a metal oxide, such as alumina, and is present in an amount such that the oligomerization catalyst contains between about 2 and about 80 wt. % of the molecular sieve.

Oligomerization Process

The oligomerization process of the invention comprises contacting the $C_3$ to $C_8$ olefin feed and the olefinic recycle stream with a molecular sieve catalyst under conditions such that the olefins are oligomerized to produce a hydrocarbon composition, conveniently comprising at least 90 wt. % of $C_9$ to $C_{20}$ non-normal olefins, non-normal saturates or combinations thereof. Typically the hydrocarbon composition comprises less than 15 wt. % of $C_{17}$+ non-normal olefins, and generally less than 15 wt. % of $C_{17}$+ hydrocarbons.

The conditions employed in the oligomerization process include a temperature between about 150° C. and about 350° C., conveniently between about 180° C. and about 330° C., for example between about 210° C. and 310° C., at the inlet to the or each reaction zone. In addition, it is desirable to ensure that the temperature across the or each reaction zone is maintained relatively constant so as to produce the desired level of $C_4$ olefin conversion at a given WHSV and point in the reaction cycle. Thus, the difference between the highest and lowest temperatures within the or each reaction zone is preferably maintained at 40° F. (22° C.) or less, such as 30° F. (17° C.) or less, for example 20° F. (11° C.) or less, conveniently 10° F. (6° C.) or less, or even 5° F. (3° C.) or less.

The oligomerization process can be conducted over a wide range of olefin partial pressures, although higher olefin partial pressures are preferred since low pressures tend to promote cyclization and cracking reactions, and are thermodynamically less favorable to the preferred oligomerization reaction. Typical partial pressures of olefins in the combined olefinic feed and light olefinic/recycle stream as total charge to the reactor comprise at least 400 psig (2860 kPa), such as at least 500 psig (3550 kPa), for example at least 600 psig (4240 kPa), or at least 700 psig (4930 kPa), or at least 800 psig (5620 kPa) or even 900 psig (6310 kPa). It will, of course, be appreciated that the olefin partial pressure will be lower at the exit to the reactor as fewer moles of olefins exist due to the oligomerization reaction.

In order to reduce required reaction volume, it is normally desirable to conduct the oligomerization reaction such that the WHSV of fresh feed to the reactor is no less than 1.5, for example no less than 2, or no less than 2.2, or no less than 2.5, or no less than 2.8, or no less than 3.1, or no less than 3.8, or no less than 4.6, or no less than 5.4, or no less than 6.2 based on olefin in the fresh feed to the reactor and the amount of molecular sieve in the oligomerization catalyst. With regard to the combined fresh olefin feed and recycle to the reactor, the WHSV is preferably no less than 2.3, or no less than 2.8, or no less than 3.4, or no less than 3.8, or no less than 4.6 or no less than 5.5 again based on the amount of molecular sieve in the oligomerization catalyst. The upper level of WHSV is not narrowly defined but is generally not more than 9 or 8 based on olefin in the fresh feed to the reactor and the amount of molecular sieve in the oligomerization catalyst. Increasing the WHSV beyond these levels may significantly decrease the catalyst/reactor cycle length between regenerations, especially at higher levels of $C_4$ conversion. For the same reason, the WHSV for the combined fresh olefin feed and recycle to the reactor is generally no more than 14, 12, 11 or 9 based on the amount of molecular sieve in the oligomerization catalyst.

Typically, the conditions of the oligomerization process are controlled so as ensure that the conversion of $C_4$ olefins in the feed is at least 80 wt. %, or at least 85 wt. % or at least 90 wt. %, but no greater than 99%, or no greater than 96 wt. %, or no greater than 95 wt. % or no greater than 94 wt. %. During the course of the oligomerization process, the catalyst will lose activity due to the accumulation of carbonaceous deposits and hence the $C_4$ olefin conversion will tend to decline with time. Thus to sustain a given level of $C_4$ olefin conversion, the temperature at which the oligomerization reaction is conducted is continually raised until some limit, discussed above, is reached. At that point, the catalyst is generally regenerated, either in situ or ex situ, by combustion of the coke deposits with oxygen/air using methods and conditions that are well known in the art. The regenerated catalyst may then be used again in the oligomerization reaction at some initial temperature, with the continually increasing temperature cycle being repeated.

Conveniently, the oligomerization process is conducted in a plurality of serial adiabatic reactors with interstage cooling, such as is disclosed in U.S. Pat. No. 4,560,536, the entire contents of which is incorporated herein by reference. In order to achieve the desired low ΔT within each reactor, more than three reactors, for example, about 4 to 10 reactors, may be required. Alternatively, the reactor or reactors employed are boiling water reactors, sometimes called heat exchanger reactors, e.g., such as is discussed in U.S. Pat. Nos. 4,263,141 and 4,369,255 (for methanol production), and "Petroleum Processing, Principles and Applications," R. J. Hengstebeck, McGraw-Hill, 1959, pages 208-218 (specifically for olefin oligomerization, using solid phosphoric acid).

Hydrocarbon Composition

The hydrocarbon composition recovered as the product stream in the process of the invention comprises at least 1.0 wt. %, such as at least 3.0 wt. %, for example at least 4.0 wt. %, conveniently at least 5.0 wt. %, or even at least 10.0 wt. % of $C_9$ non-normal olefins. Further, the hydrocarbon product stream comprises no greater than 30 wt. %, such as no greater than 25 wt. %, for example no greater than 20 wt. %, conveniently no greater than 15 wt. % of $C_9$ non-normal olefins.

In general, the hydrocarbon product stream contains at least 90 wt. %, for example at least 92 wt %, such as at least 95 wt %, or even at least 97 wt. % of $C_9$ to $C_{20}$ non-normal olefins, non-normal saturates or combinations thereof. Moreover, the hydrocarbon product stream generally contains at least 0.5 wt. %, or at least 1.0 wt. %, or at least 2.0 wt. %, or even at least 3.0 wt. % of $C_{17}$ to $C_{20}$ non-normal olefins, but typically no greater than 15 wt. %, or no greater than 12.0 wt. %, or no greater than 10.0 wt. %, or no greater than 8.0 wt. %, or no greater than 6.0 wt. %, or even no greater than 4.0 wt. % of $C_{17}$ to $C_{20}$ non-normal olefins. $C_{21}$+ hydrocarbons, such as non-normal olefins, may also be present, though typically the content is very low or even undetectable.

The initial boiling point of the hydrocarbon product stream is typically at least 127° C. (260° F.), such as at least 140° C. (284° F.), conveniently at least 150° C. (302° F.), including at least 160° C. (320° F.), or even at least 170° C. (338° F.). The final boiling point of the hydrocarbon product stream is typically no greater than 350° C., such as no greater than 330° C., for example no greater than 310° C. or even no greater than 300° C.

The hydrocarbon product stream produced by the oligomerization process of the invention can be used directly as a blending stock to produce jet or diesel fuel. Alternatively, the hydrocarbon product stream can be hydrogenated, e.g., according to the method of U.S. Pat. Nos. 4,211,640 and 6,548,721, the entire contents of which are incorporated herein by reference, to saturate at least part of the olefins therein and produce a saturated product. The saturated product can contain least 80 wt. %, or at least 85 wt. %, or at least 90 wt. %, or at least 95 wt % or at least 99 wt. % aliphatic hydrocarbons. All other characteristics of the saturated distillate product in terms of carbon number distribution, non-normal proportions and boiling point ranges will remain largely unchanged from the olefinic product.

Referring now to FIG. 1, there is shown one example of an oligomerization process for producing a hydrocarbon composition according to the invention. The process shown in FIG. 1 employs an olefin oligomerization system 10, comprising a heat exchanger reactor system 26 and a separation device 46, among other elements. A fresh feedstock stream containing at least one $C_3$ to $C_8$ olefin is provided in line 12, and an olefinic recycle stream rich in $C_9$– hydrocarbons is provided in line 14, such that the mass ratio of the flow of olefinic recycle in line 14 to the flow of feedstock in line 12 is at least 0.1 and no greater than 3.0. The combined materials are provided via line 16 to feed/effluent heat exchanger 18 to form a first heated combined reactor feed in line 20. The first heated combined reactor feed in line 20 is passed through a preheat exchanger 22 to form a second heated combined reactor feed in line 24. The unnumbered line through preheat exchanger 22 represents a heating medium, for example 900 psig (6310 kPa) steam, and the second heated combined reactor feed in line 24 should be at a greater temperature than the first heated combined reactor feed in line 20, but have a temperature no greater than the desired oligomerization reaction temperature in heat exchanger reactor 27.

The second heated combined reactor feed in line 24 is provided to heat exchanger reactor 27, where it flows through tubes 28, coming into contact with catalyst contained within the tubes 28. The rate of flow of the second heated combined reactor feed in line 24 and amount of catalyst within the tubes 28 of heat exchanger reactor 27 are such that a WHSV of at least 2.3 is achieved, based on the content of olefin in the second heated combined reactor feed in line 24 and the amount of molecular sieve in the catalyst.

The oligomerization reaction thus occurs within tubes 28, generating heat, which passes through tubes 28 to be absorbed by boiling water flowing around the outside of the tubes in shell side 30 of the reactor 27. The boiling water in shell side 30 is a mixture of steam and liquid water that passes through line 38 to disengaging vessel 34. Make-up liquid boiler feed water is provided in line 32 to disengaging vessel 34, and the combined liquid make-up boiler feed water and liquid water formed in the disengaging vessel 34 from the mixture of steam and liquid water that came through line 38 exit the bottom of disengaging vessel 34 through line 36. The steam generated in the heat exchanger reactor 27 emanates from the top of disengaging vessel 34 through line 40, and may be used, for example, to provide heat in fractionation tower reboilers or to make electricity in turbogenerators. The liquid water in line 36 is then provided to the shell side of heat exchanger reactor 27 to become the boiling water in shell side 30.

The presence of a relatively pure heat exchange component, such as water, in a boiling state on the shell side 30 provides an almost constant temperature within shell side 30 and can, given other appropriate design considerations of heat exchanger reactor 27, provide for a very close approach to isothermal conditions for the reaction occurring within the tubes 28. The difference between the highest and lowest temperature within and between all tubes 28 in heat exchanger reactor 27 is no greater than 40° F. (22° C.). Further, this configuration of heat exchanger reactor system 26 allows for good control of the reaction temperature within tubes 28 through controlling the pressure within the disengaging vessel 34 (sometimes called a "steam drum"). The pressure in the steam drum 34 controls the temperature at which the water will boil in shell side 30, one of the key factors governing the rate of absorption of the heat of reaction within tubes 28.

As the catalyst in tubes 28 deactivates with time on stream, a given level of conversion of olefins can be obtained by increasing the pressure in steam drum 34, thus increasing the boiling temperature of the fluid in shell side 30, and increasing the temperature of the oligomerization reaction within tubes 28. Of course, the temperature of the boiling fluid in shell side 30 must be kept lower than the desired oligomerization reaction temperature within tubes 28, conveniently at least 5° C. lower, such as at least 10° C. lower, including at least 15° C. lower and even at least 20° C. lower, but typically not exceeding 40° C. lower to reduce the risk of introducing too great a radial temperature gradient within tubes 28 and decreasing the isothermality of the oligomerization reaction within tubes 28.

One design consideration for approaching isothermal conditions in heat exchanger reactor 27 is a relatively small diameter for the tubes 28, for example, an outside diameter of less than about 3 inches (7.6 cm), conveniently less than about 2 inches (5.1 cm), such as less than about 1.5 inches (3.8 cm), and an inside diameter commensurate with the desired pressure rating for the inside of the tubes 28. This provides a relatively small resistance to heat transfer relative to the heat generated per unit volume of reaction space within tubes 28. Another such design consideration is a relatively long length for tubes 28, such as greater than about 5 meters, including greater than about 7 meters, conveniently greater than about 9 meters, which reduces the heat release per unit volume of reaction within tubes 28 and also promotes isothermality.

The oligomerization reaction product exits heat exchanger reactor 27 through line 42, and is provided to feed/effluent exchanger 18. The cooled reaction product exits feed/effluent exchanger 18 through line 44, and is provided to separation device 46. Separation device 46 may include one or more well known elements, such as fractionation columns, membranes, and flash drums, among other elements, and serves to separate the various components in the cooled reaction product in line 44 into various streams having differing concentrations of components than the cooled reaction product in line 44, including the hydrocarbon composition of the invention which exits through line 48 and the olefinic recycle stream which exits through line 14. Additionally, one or more purge streams may be produced by separation device 46 and exit via line 50. Such purge streams in line 50 conveniently include streams richer in saturated hydrocarbons than the feedstock stream in line 12, such as a $C_4-$ rich stream containing unreacted butylenes and relatively concentrated $C_4-$ saturates, or a portion of material of identical or similar composition to that of the olefinic recycle in line 14 and relatively concentrated in $C_5+$ saturates. Providing such purge streams is convenient in controlling the partial pressure of olefins provided for reaction in heat exchanger reactor 27.

The invention will now be more particularly described with reference to the following examples.

EXAMPLE 1

Four separate commercial ZSM-5 samples having the properties summarized in Table 1 below as catalysts A to D were tested in the oligomerization of butenes. Catalyst D was a sample of COD-9 provided by Sud-Chemie AG, Lenbachplatz 6, D-80333 Munich, manufactured and used commercially to convert olefins to diesel and gasoline fuels. Each catalyst was loaded into fixed bed pilot reactor and used to process a feedstock comprising 52-58 wt % butenes, 10-11 wt % isobutane and the balance being heptane. In each case, the feedstock was initially saturated with water by passing the feedstock upwardly through a vessel containing water at a constant 40° C. and was then preheated to the desired processing temperature. Processing conditions for each catalyst run included a pressure of 7,000 kPa, a range of WRHSV from 14 to 28 based on total feed to the reactor and total catalyst weight (zeolite plus binder). For catalysts A to C, the reactor inlet temperature was set at 210 to 215° C., whereas for catalyst D the reactor inlet temperature was set to 210-215° C. For catalyst D, the reactor inlet temperature was set to 210-225° C. The product effluent was cooled to near room temperature and depressured to 2,000 kPa, at which pressure total reactor effluent samples were taken and analyzed by gas chromatography. The feed and product olefin/paraffin ratios were compared in order to measure conversion. The liquid product was analyzed by a gas chromatograph equipped with a platinum catalyst to hydrogenate product olefins to paraffins and the carbon number distribution and paraffin distribution were measured. The results are summarized in FIGS. 2 to 5, from which it will be seen that catalyst A exhibited the highest oligomerization activity, the lowest cracking activity, the highest $C_8$ selectivity, the lowest heavies ($C_{16}+$) selectivity and the lowest n-butane selectivity of the four ZSM-5 catalysts tested.

TABLE 1

| Catalyst | % Alumina | % ZSM-5 | Alpha G(102) | $SiO_2/Al_2O_3$ | Crystal Size (μm) |
|---|---|---|---|---|---|
| A | 35 | 65 | 200 | 50 | <0.05 homogeneous |
| B | 35 | 65 | 1100 | 18 | 0.02-0.05 homogeneous |
| C | 35 | 65 | 200 | 55 | 0.06-0.12 |
| D | unknown | unknown | unknown | unknown | unknown |

EXAMPLE 2

Figure 6:
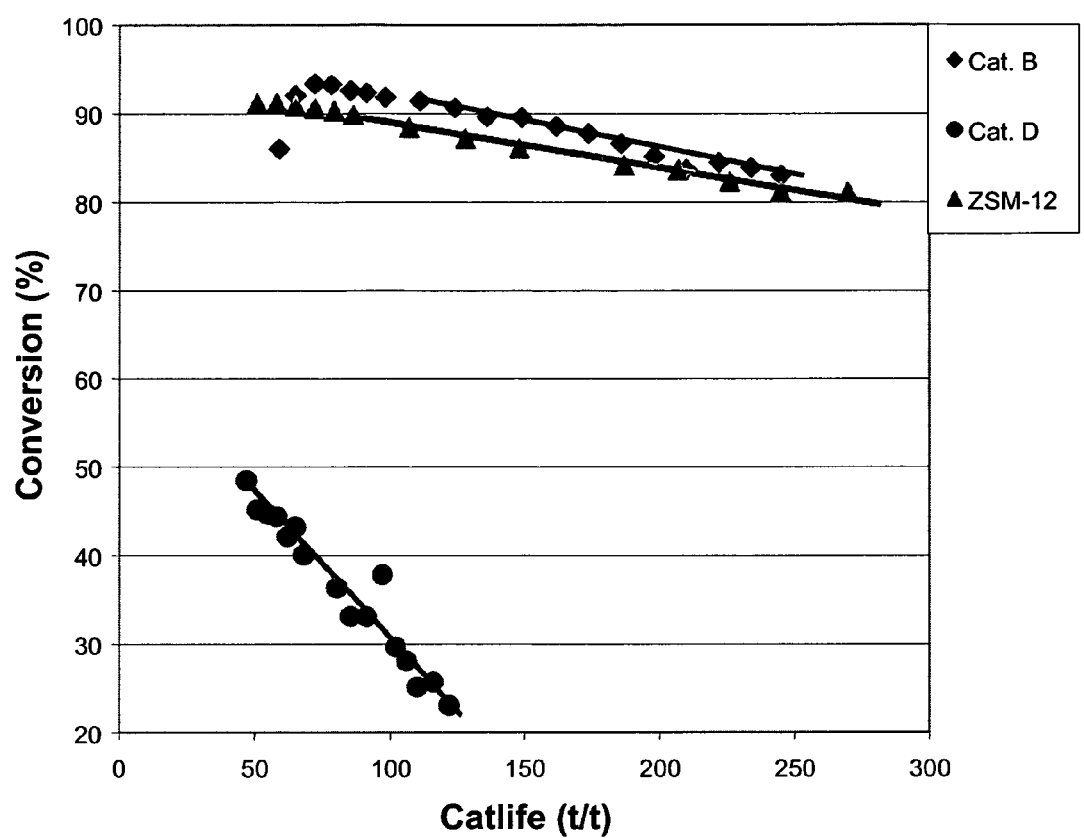
FIG. 6 is a graph of percentage conversion against time on stream for the ZSM-5 catalysts A and D of Example 1 and the ZSM-12 catalyst of Example 2.
Figure 7:
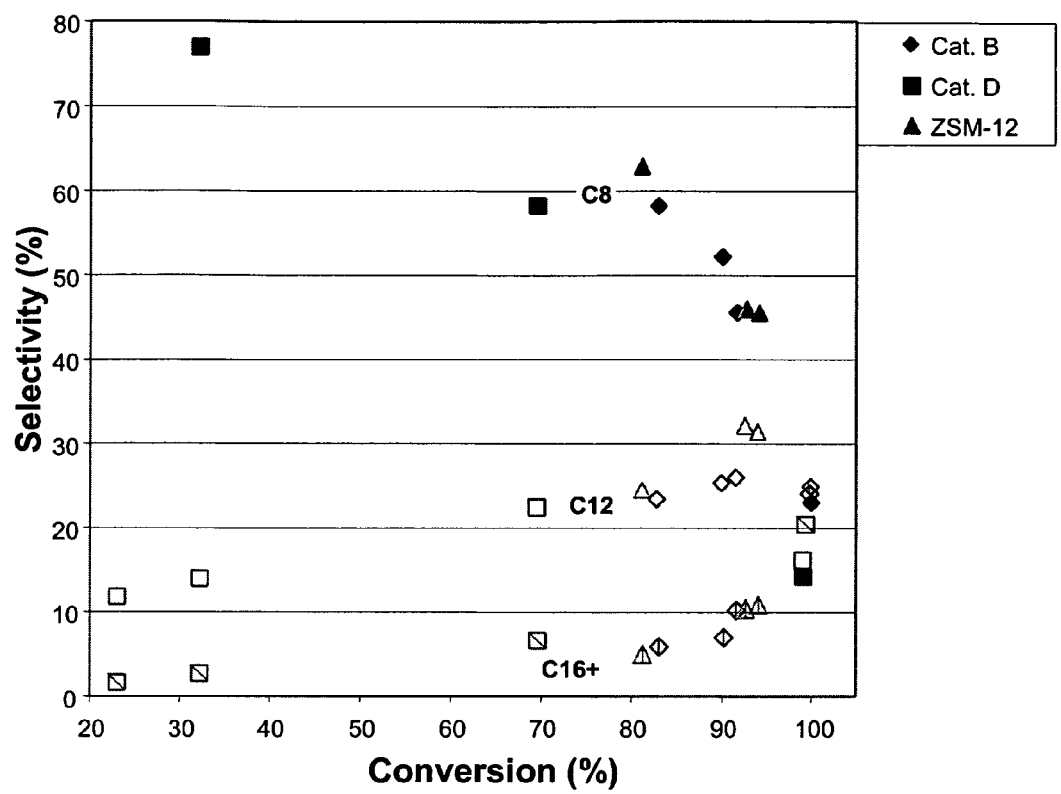
FIG. 7 is a graph of selectivity to $C_8$, $C_{12}$ and $C_{16}$+ hydrocarbons against percentage conversion for the ZSM-5 catalysts A and D of Example 1 and the ZSM-12 catalyst of Example 2.
Figure 8:
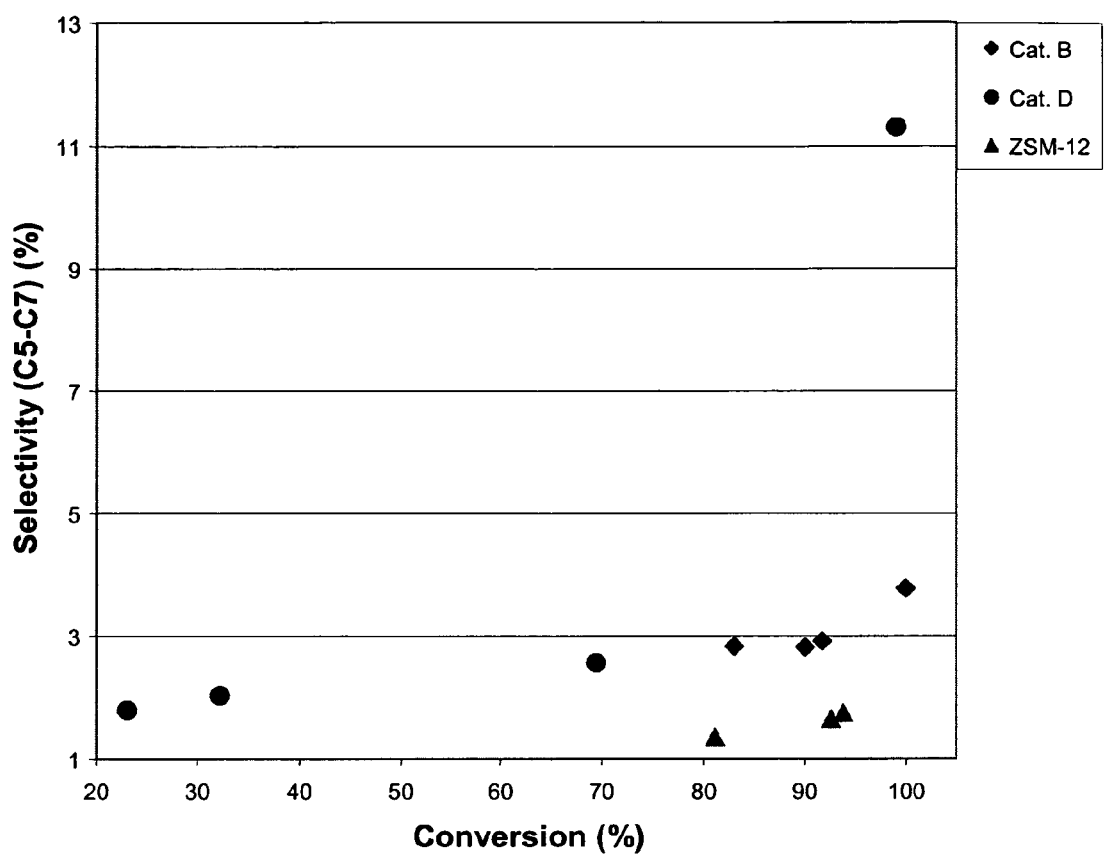
FIG. 8 is a graph of lights ($C_5$ to $C_7$) make against percentage conversion for the ZSM-5 catalysts A and D of Example 1 and the ZSM-12 catalyst of Example 2.
Figure 9:
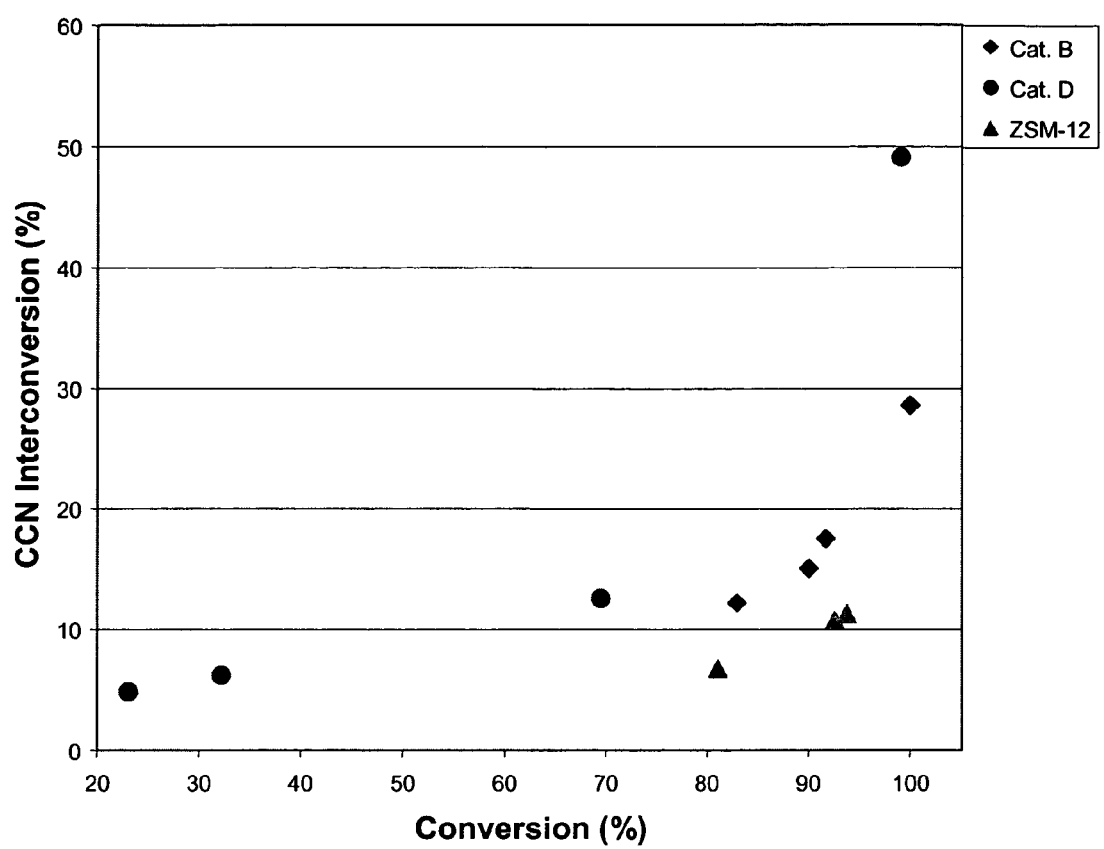
FIG. 9 is a graph of percentage carbon number interconversion (sum of C5+C6+C7+C9+C10+C11+C13+C14+C15) against percentage conversion for the ZSM-5 catalysts A and D of Example 1 and the ZSM-12 catalyst of Example 2.

The performance of catalysts A and D from Example 1 were compared with that of a ZSM-12 catalyst using the feedstock and process conditions described in Example 1 except the inlet temperature was 190° C. instead of 210-215° C. The ZSM-12 have a narrow crystallite size distribution centered on 0.05 microns (homogeneous crystals), an alpha value of 300, a silica to alumina of 45 and was formed into a catalyst comprising 65 wt % ZSM-12 and 35 wt % alumina. The results of the comparison are shown in FIGS. 6 to 9. As shown in FIG. 6, the ZSM-12 catalyst achieved similar conversion to the most active ZSM-5 catalyst (catalyst A) at a 25° C. lower set-point temperature. Moreover, the deactivation rate, as depicted by decreasing conversion at constant temperature, was lower for the ZSM-12 catalyst than that for either of catalysts A and D. As shown in FIG. 7, the ZSM-12 catalyst made similar amounts of $C_8$ and $C_{12}$ oligomers as the ZSM-5 catalysts A and D and also had a similar selectivity to C16+ heavies. In contrast, the ZSM-12 catalyst showed decreased formation of light ($C_5$ to $C_7$) hydrocarbons as compared with the ZSM-5 catalysts (FIG. 8) and a lower level of carbon number interconversion (FIG. 9).

EXAMPLE 3

Figure 10:
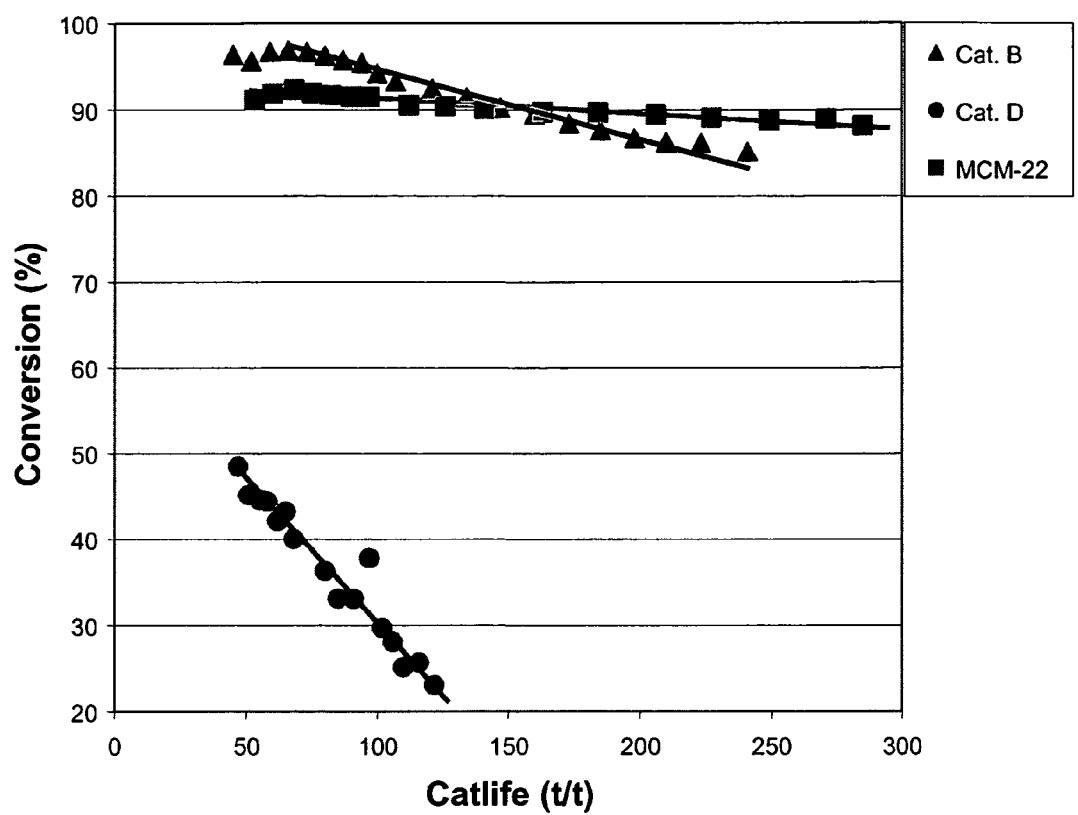
FIG. 10 is a graph of percentage conversion against time on stream for the ZSM-5 catalysts A and D of Example 1 and the MCM-22 catalyst of Example 3.
Figure 11:
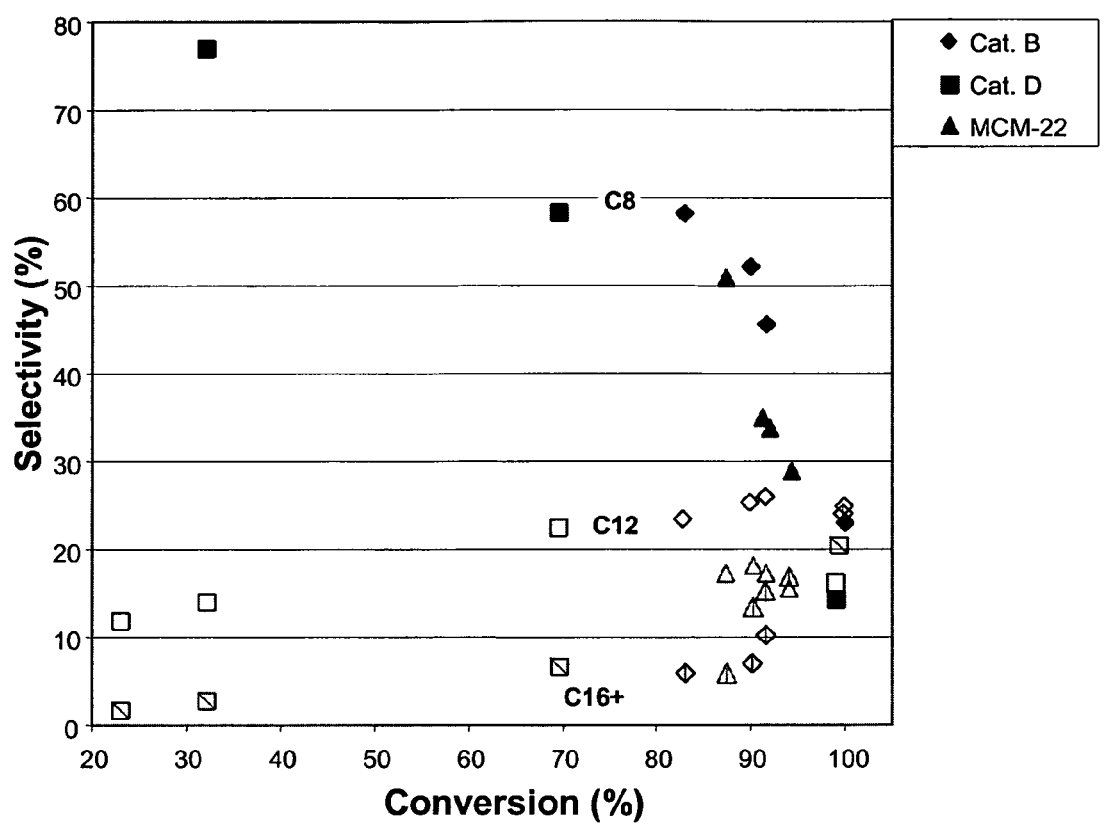
FIG. 11 is a graph of selectivity to $C_8$, $C_{12}$ and $C_{16}$+ hydrocarbons against percentage conversion for the ZSM-5 catalysts A and D of Example 1 and the MCM-22 catalyst of Example 3.
Figure 12:
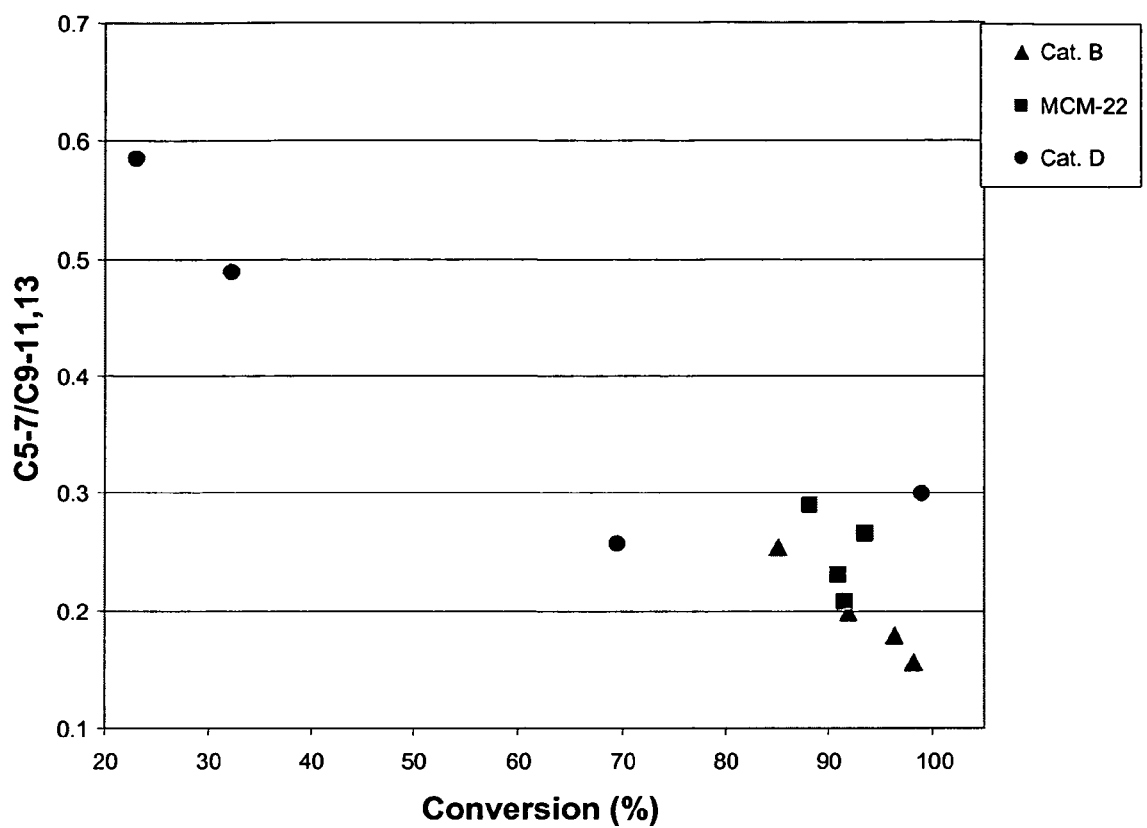
FIG. 12 is a graph of ratio the amount of $C_5$ to $C_7$ hydrocarbons to the amount of $C_9$ to $C_{11}$ and $C_{13}$ hydrocarbons against percentage conversion for the ZSM-5 catalysts A and D of Example 1 and the MCM-22 catalyst of Example 3.
Figure 13:
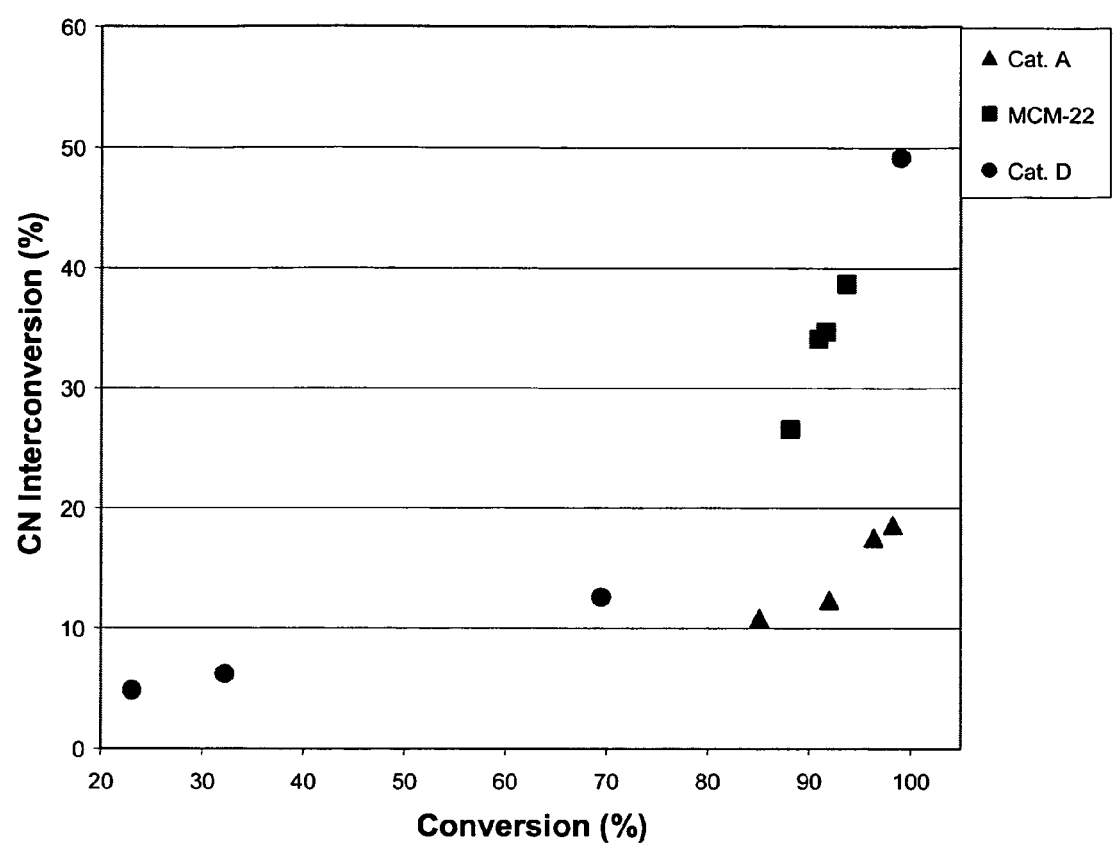
FIG. 13 is a graph of percentage carbon number interconversion (sum of C5+C6+C7+C9+C10+C11+C13+C14+C15) against percentage conversion for the ZSM-5 catalysts A and D of Example 1 and the MCM-22 catalyst of Example 3.

The performance of catalysts A and D from Example 1 were compared with that of an MCM-22 catalyst using the feedstock and process conditions described in Example 1 except the inlet temperature was 180-190° C. instead of 210-215° C. The MCM-22 crystals are nearly two dimensional hexagonal platelets. The hexagonal platelets have a narrow particle size distribution (are homogeneous) centered on 1 micron. The platelets range between 0.005 and 0.01 microns thick an alpha value of 300, a silica to alumina of 24 and was formed into a catalyst comprising 100 wt % MCM-22 and 0 wt % alumina (selfbound). The results of the comparison are shown in FIGS. 10 to 13. As shown in FIG. 10, the MCM-22 catalyst achieved similar conversion to the most active ZSM-5 catalyst (catalyst A) at a 35° C. lower set-point temperature. Moreover, the deactivation rate, as depicted by decreasing conversion at constant temperature, was lower for the MCM-22 catalyst than that of either of catalysts A and D. As shown in FIG. 11, the MCM-22 catalyst made less $C_8$ and $C_{12}$ oligomers than the ZSM-5 catalysts A and D but showed an increased selectivity to C16+ heavies. As shown in FIG. 13, the lower selectivity to $C_8$ and $C_{12}$ oligomers of the MCM-22 catalyst may be explained by its increased carbon number interconversion. As shown in FIG. 12, the ratio of the amount of $C_5$ to $C_7$ hydrocarbons to the amount of $C_9$ to $C_{11}$ and $C_{13}$ hydrocarbons produced by the MCM-22 catalyst was similar to that produced by the ZSM-5 catalysts.

EXAMPLE 4

Olefinic feedstock and recycle materials were prepared as shown in Table 2 and were oligomerized over a catalyst comprising 65 wt. % of 0.02 to 0.05 micron crystals of ZSM-5 having a $SiO_2/Al_2O_3$ molar ratio of 50:1, and 35 wt. % of an alumina binder, shown as catalyst A in Table 1. The catalyst was in the form of 1/16 inch extrudates and about 90 cc of catalyst was blended with about 202 cc of inert, silicon carbide beads to reduce the heat generation per unit volume of reaction and placed in the reaction bed of a tubular reactor equipped with a heat management system that allowed the oligomerization reaction to proceed under near isothermal conditions.

TABLE 2

| | Charge A | | Charge B | |
|---|---|---|---|---|
| | Feed | Recycle | Feed | Recycle |
| Wt. % | 49.5 | 50.5 | 41.8 | 58.2 |
| Proportion | 1.0 | 1.0 | 1.0 | 1.4 |
| Comp. Wt. % | | | | |
| Ethane | 0.0 | 0.0 | 0.0 | 0.0 |
| Ethylene | 0.0 | 0.0 | 0.0 | 0.0 |
| Propane | 0.0 | 0.0 | 0.0 | 0.0 |
| Propene | 0.0 | 0.0 | 0.0 | 0.0 |
| iso-butane | 7.2 | 0.1 | 1.0 | 0.0 |
| n-butane | 0.1 | 0.0 | 11.6 | 0.0 |
| t-butene-2 | 0.0 | 0.1 | 27.2 | 0.0 |
| butene-1 | 72.3 | 0.0 | 16.3 | 0.0 |
| iso-butene | 2.9 | 0.0 | 2.7 | 0.0 |
| c-butene-2 | 0.0 | 0.0 | 20.1 | 0.0 |
| iso-pentane | 0.0 | 0.1 | 0.8 | 0.0 |
| n-pentane | 1.7 | 0.0 | 1.6 | 0.0 |
| 1,3-butadiene | 0.0 | 0.0 | 0.1 | 0.0 |
| C5 olefins | 15.8 | 0.1 | 17.3 | 0.2 |
| C6 sats | 0.0 | 0.0 | 0.2 | 0.0 |
| C6 olefins | 0.0 | 0.5 | 1.2 | 1.3 |
| C7 olefins | 0.0 | 1.3 | 0.0 | 3.2 |
| n-heptane | 0.0 | 8.1 | 0.0 | 10.6 |
| C8 olefins | 0.0 | 73.7 | 0.0 | 55.6 |
| C9 olefins | 0.0 | 15.1 | 0.0 | 27.7 |
| C10 olefins | 0.0 | 0.8 | 0.0 | 1.3 |
| Total | 100.0 | 100.0 | 100.0 | 100.0 |

Over the course of the experimental run, various charges were provided to the reactor to test performance under various conditions over an extended period of time. As the experimental run progressed, the catalyst activity declined, requiring an increase in reactor temperature later in the run to achieve a given conversion of feedstock olefins. In two particular experiments, the feedstock and recycle materials were blended in the proportions shown in Table 2, and the single blended stream ("Charge") was provided to the reactor at 1000 psig (7000 kPa) and other conditions shown in Table 3; wherein the WHSV is based on based on the olefin in the total charge (combined feed and recycle) and the total catalyst composition (ZSM-5 and binder). Four thermocouples were available, positioned evenly through the reaction bed in the reactor, with one very near the first point where the charge and catalyst come into contact, and one very near the outlet of the reaction bed. The difference between the highest and lowest temperatures within the reactor was from 2 to 7° C. The reaction product was analyzed with a gas chromatograph, and the composition of the products is provided in Table 3. No products having a carbon number greater than 21 were detected.

TABLE 3

| | Experiment (ca. Days On Stream) | |
|---|---|---|
| | 23 | 59 |
| Charge | A | B |
| Reactor T (° C.) | 235 | 274 |
| WHSV (1/hr) | 4.2 | 3.9 |
| Product Comp. Wt. % | | |
| Ethane | 0.0 | 0.0 |
| Ethylene | 0.0 | 0.0 |
| Propane | 0.0 | 0.0 |
| Propene | 0.1 | 0.1 |
| iso-butane | 3.6 | 0.5 |
| n-butane | 0.1 | 4.3 |

TABLE 3-continued

| | Experiment (ca. Days On Stream) | |
|---|---|---|
| | 23 | 59 |
| t-butene-2 | 2.0 | 0.7 |
| butene-1 | 0.6 | 0.2 |
| iso-butene | 0.2 | 0.2 |
| c-butene-2 | 1.3 | 0.4 |
| iso-pentane | 0.1 | 0.4 |
| n-pentane | 0.1 | 0.6 |
| 1,3-butadiene | 0.0 | 0.0 |
| C5 olef | 1.6 | 1.5 |
| C6 sats | 0.1 | 0.1 |
| C6 olefins | 0.9 | 1.0 |
| C7 olefins | 1.6 | 2.3 |
| n-heptane | 4.6 | 6.6 |
| C8 olefins | 40.2 | 29.8 |
| C9 olefins | 15.8 | 19.0 |
| C10 olefins | 2.8 | 4.0 |
| C11 olefins | 2.5 | 3.2 |
| C12 olefins | 12.4 | 12.1 |
| C13-C15 olefins | 4.3 | 6.5 |

TABLE 3-continued

| | Experiment (ca. Days On Stream) | |
|---|---|---|
| | 23 | 59 |
| C16 olefins | 4.4 | 4.9 |
| C17-C20 olefins | 0.8 | 1.6 |
| Total | 100.0 | 100.0 |

EXAMPLE 5

The same apparatus and procedure as Example 4 was utilized for a further, extended experimental run with a fresh batch of catalyst and another set of charge compositions as shown in Table 4. The olefinic feedstocks shown in Table 4 were produced by reacting methanol over a SAPO-34 catalyst generally according to the method of U.S. Pat. No. 6,673,978, with separation of the methanol reaction products to provide a $C_4+$ olefin composition. Over 90 wt. % of the olefins in each feed composition were normal in atomic configuration, and the feed composition further contained about 1000 wppm oxygenates, such as methanol and acetone (not shown in Table 4). Some minor adjustments of some components in the feed compositions were made by additions of reagent grade materials to test certain aspects of the operation.

The olefinic recycle compositions shown in Table 4 were produced by taking accumulated batches of the reaction products from Example 4 and this further experimental run and periodically providing those batches to a fractionation tower to separate a distillate product from a light olefinic recycle material, collecting those fractionated materials, and using the fractionated light olefinic recycle material for subsequent experiments. Over 90 wt. % of the olefins in each recycle composition were non-normal in atomic configuration. Some minor adjustments of some components in the recycle compositions were made via addition of reagent grade materials to account for unavoidable losses in the fractionation step and test certain other aspects of the operation.

TABLE 4

| | Charge C | | Charge D | | Charge E | | Charge F | |
|---|---|---|---|---|---|---|---|---|
| | Feed | Recycle | Feed | Recycle | Feed | Recycle | Feed | Recycle |
| Wt. % | 38.3 | 61.7 | 45.5 | 54.5 | 49.7 | 50.3 | 47.6 | 52.4 |
| Proportion Comp. Wt. % | 1.0 | 1.6 | 1.0 | 1.2 | 1.0 | 1.0 | 1.0 | 1.1 |
| Butane | 2.0 | 16.6 | 2.3 | 10.0 | 2.8 | 9.3 | 2.1 | 7.5 |
| Butenes | 63.5 | 3.1 | 64.4 | 2.7 | 64.6 | 3.0 | 64.9 | 3.1 |
| Dienes | 0.1 | 0.0 | 0.1 | 0.0 | 0.1 | 0.0 | 0.1 | 0.0 |
| Pentane | 0.5 | 4.7 | 1.8 | 0.2 | 1.4 | 1.0 | 1.5 | 1.9 |
| Pentenes | 21.8 | 1.7 | 20.8 | 2.3 | 20.7 | 2.5 | 21.1 | 2.3 |
| Hexanes | 0.3 | 0.1 | 0.3 | 0.1 | 0.2 | 0.3 | 0.2 | 0.5 |
| Hexenes | 11.8 | 1.3 | 10.4 | 3.1 | 10.3 | 3.5 | 10.1 | 4.3 |
| Heptenes | 0.0 | 3.0 | 0.0 | 3.4 | 0.0 | 3.2 | 0.0 | 3.4 |
| n-Heptane | 0.0 | 6.6 | 0.0 | 7.5 | 0.0 | 7.6 | 0.0 | 8.1 |
| Octenes | 0.0 | 44.1 | 0.0 | 49.6 | 0.0 | 48.9 | 0.0 | 52.8 |
| Nonenes | 0.0 | 18.6 | 0.0 | 21.0 | 0.0 | 20.5 | 0.0 | 16.2 |
| Decenes | 0.0 | 0.2 | 0.0 | 0.2 | 0.0 | 0.2 | 0.0 | 0.0 |
| Total | 100.0 | 100.0 | 100.0 | 100.0 | 100.0 | 100.0 | 100.0 | 100.0 |

For a number of particular experiments using the charge material and proportions shown in Table 4, the butylene conversion and yield of $C_{10}+$ material in the reactor product for each of the charge compositions under a variety of temperatures and approximate days on stream are provided in Table 5. In all of the experiments shown in Table 5, the total reactor pressure was about 1000 psig (7000 kPa), the WHSV was between 3.5 and 4.0 based on the olefin in the total charge (combined feed and recycle) and the total catalyst composition (ZSM-5 and binder), and the difference between the highest and lowest temperatures within the reactor was 10° C. or less.

TABLE 5

| Experiment (Days on Stream) | Charge | Reactor T (° C.) | C4= conversion (wt. %) | C10+ yield (wt. %) |
|---|---|---|---|---|
| 2 | C | 207 | 93.3 | 38.0 |
| 3 | C | 212 | 97.9 | 43.4 |
| 5 | C | 211 | 91.9 | 36.0 |

TABLE 5-continued

| Experiment (Days on Stream) | Charge | Reactor T (° C.) | C4 = conversion (wt. %) | C10+ yield (wt. %) |
|---|---|---|---|---|
| 8 | C | 211 | 87.9 | 32.1 |
| 13 | D | 221 | 98.4 | 46.3 |
| 14 | D | 220 | 96.3 | 41.6 |
| 15 | D | 220 | 95.5 | 40.2 |
| 17 | D | 220 | 92.4 | 37.1 |
| 20 | E | 225 | 95.6 | 40.1 |
| 24 | E | 227 | 94.6 | 38.3 |
| 32 | E | 233 | 95.1 | 37.4 |
| 41 | E | 244 | 96.2 | 37.6 |
| 46 | E | 247 | 96.2 | 37.5 |
| 51 | E | 253 | 97.2 | 38.7 |
| 55 | F | 252 | 94.9 | 33.0 |
| 57 | F | 255 | 96.0 | 33.5 |
| 59 | F | 259 | 97.0 | 37.0 |
| 62 | F | 259 | 96.8 | 36.0 |

EXAMPLE 6

Several batches of distillate materials were produced from the fractionation of various batches of reactor product obtained in Examples 4 and 5. The carbon number distribution of these non-hydrogenated distillate material batches are provided in Tables 6 and 6A. Distillates 1 and 2 in Tables 6 and 6A were obtained from fractionation operations using the aggregate reactor product from Example 4, while Distillate 3 was obtained from fractionation operations of the aggregate reactor product from Charges C, D and E used in Example 5. All of the distillate materials contain all of the $C_{11}$+ and almost all of the $C_{10}$ material present from the reaction products, i.e., no separation of any components heavier than $C_{11}$ was conducted on the reactor product in obtaining the distillate materials. As obtained directly from the reactor product via the fractionation tower, all the distillate materials are over 90 wt. % non-normal olefins, and further contain very low amounts of aromatics (<100 wppm).

EXAMPLE 7

The batches of distillate materials obtained in Example 6 were hydrogenated in discrete batches by reacting them with hydrogen over a hydrogenation catalyst. Distillates 1 and 2 were hydrogenated over a nickel-containing catalyst while Distillate 3 was hydrogenated over a platinum/palladium-containing catalyst, each according to operations and conditions well known. The carbon number distribution of the hydrogenated distillates is provided in Table 6. Hydrogenation did not significantly change the non-normal character of distillate compositions although, following hydrogenation, the distillate materials were almost completely aliphatic. No products having a carbon number greater than 21 were detected. Table 6 provides the carbon number distribution according to the Linear Paraffin method, which defines carbon number between two adjacent linear paraffins and integrates each normal peak separately.

In Table 6A the carbon distribution of the non-hydrogenated distillate samples is given. It gives the carbon or isomer distribution. Cn is then defined as all isomers with carbon number "n". With the Linear Paraffin method what is defined as Cn, can contain e.g. a Cn−1 or Cn+1 isomer due to overlapping GC peaks. As a result, there are differences between the carbon distribution in Table 6 and 6A for the same distillate samples.

The GC analysis data for both Table 6 and 6A were collected on a PONA Gas Chromatograph. On this GC, the distillate sample, prior to entering the GC separation column, is coinjected with hydrogen across a small reactor bed containing saturation catalyst. All the olefinic material in the distillate sample to the GC separation column is thus saturated (if not yet saturated before by hydrogenation). However, it is believed that the carbon number distribution (CND) measured herein are accurate.

TABLE 6

| | Distillate | | |
|---|---|---|---|
| | 1 | 2 | 3 |
| Comp (wt. %) | Before and after hydrogenation | | |
| C4-C7 | 0.1 | | 0.1 |
| C8 | 0.0 | | 0.1 |
| C9 | 4.8 | | 12.6 |
| C10 | 8.7 | | 12.6 |
| C11 | 16.2 | | 14.3 |
| C12 | 32.0 | | 22.8 |
| C13 | 12.8 | | 11.6 |
| C14 | 5.7 | | 6.9 |
| C15 | 8.1 | | 7.7 |
| C16 | 5.8 | | 5.3 |
| C17 | 2.2 | | 2.5 |
| C18 | 1.5 | | 1.7 |
| C19 | 1.2 | | 1.1 |
| C20 | 1.0 | | 0.7 |
| Total | 100.0 | 0.0 | 100.0 |
| % normal paraffins | 3.17 | | 2.75 |

TABLE 6A

| | Distillate | | |
|---|---|---|---|
| | 1 | 2 | 3 |
| | Before hydrogenation | | |
| Comp (wt. %) | | | |
| C4-C7 | 0.3 | 0.4 | 0.7 |
| C8 | 0.4 | 1.0 | 1.0 |
| C9 | 4.9 | 19.8 | 13.3 |
| C10 | 8.7 | 9.4 | 13.0 |
| C11 | 8.5 | 7.5 | 8.1 |
| C12 | 39.1 | 32.4 | 29.2 |
| C13-C15 | 16.7 | 14.9 | 16.0 |
| C16 | 15.9 | 11.2 | 13.8 |
| C17-C20 | 5.6 | 3.6 | 5.0 |
| Total | 100.0 | 100.0 | 100.0 |

Table 7 provides composition and other physical and fuel performance properties of the hydrogenated distillate materials.

TABLE 7

| | Distillate | | | |
|---|---|---|---|---|
| | 1 | 2 | 3 | |
| | After hydrogenation | | | |
| Distillation T10 (° C.) | 188 | 165 | 171 | ASTM D86 |
| Distillation T90 (° C.) | 265 | 250 | 269 | ASTM D86 |
| Distillation End Point (° C.) | 304 | 293 | 308 | ASTM D86 |
| Flash Point (° C.) | 57 | 42 | 47 | ASTM D94 |
| Density @ 15° C. (kg/l) | 0.767 | 0.756 | 0.765 | ISO 12185 |
| Viscosity @ 40° C. (mm2/s) | 1.53 | 1.26 | 1.42 | ASTM D445 |

TABLE 7-continued

| | Distillate | | | |
|---|---|---|---|---|
| | 1 | 2 | 3 | |
| | After hydrogenation | | | |
| Viscosity @ 20° C. (mm2/s) | 2.16 | 1.72 | | ASTM D445 |
| Viscosity @ −20° C. (mm2/s) | 6.06 | 4.15 | | ASTM D445 |
| Freeze Point (° C.) | −56 | −62 | <−50 | ASTM D2386 |
| Aromatics (wppm) | 25 | | 49 | Ultra-violet |
| Sulfur (wppm) | <0.1 | <0.1 | <0.1 | ASTM D2622 |
| Olefins (wt. %) | <0.01 | <0.01 | <0.01 | ASTMD2710 |

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A process for producing a hydrocarbon composition, the process comprising:
   (a) contacting a feed comprising at least one $C_3$ to $C_8$ olefin and an olefinic recycle stream rich in $C_9-$ hydrocarbons with a SAPO catalyst having an average crystal size no greater than 0.15 micron and an alpha value between about 100 and about 600 in at least one reaction zone under olefin oligomerization conditions including an inlet temperature between about 180° C. and about 340° C., a pressure of at least 2,860 kPa and a recycle to feed weight ratio of about 0.1 to about 3.0, said contacting producing a oligomerization effluent stream; and
   (b) separating said oligomerization effluent stream into at least a hydrocarbon product stream rich in $C_9+$ hydrocarbons for jet fuel, kerosene and No. 1 Diesel, and said olefinic recycle stream; wherein $C_{21}^+$ hydrocarbons are not detectable in the hydrocarbon product stream and wherein the hydrocarbon product stream comprises at least 90 wt. % of $C_9$ to $C_{20}$ non-normal olefins, non-normal saturates or combinations thereof.

2. The process of claim 1 wherein said feed comprises a mixture of $C_3$ to $C_5$ olefins comprising at least 5 wt. % of $C_4$ olefin.

3. The process of claim 2 wherein said mixture comprises at least 40 wt. % of $C_4$ olefin and at least 10 wt. % of $C_5$ olefin.

4. The process of claim 1 wherein said feed contains $C_4$ olefin and the contacting (a) is conducted so as to convert about 80 wt. % to about 99 wt. % of the $C_4$ olefin in the feed.

5. The process of claim 1 wherein the recycle to feed weight ratio in said contacting (a) is about 0.5 to about 2.0.

6. The process of claim 1 wherein the contacting (a) is conducted at a WHSV of at least 1.5 based on the olefin in the feed.

7. The process of claim 1 wherein the contacting (a) is conducted at a WHSV of about 1.8 to about 9 based on the olefin in the feed.

8. The process of claim 1 wherein the contacting (a) is conducted at a WHSV of about 2.3 to about 14 based on the olefin in the combined feed and olefinic recycle stream.

9. The process of claim 1 wherein the contacting (a) is conducted such that the difference between the highest and lowest temperatures within the or each reaction zone is 40° F. (22° C.) or less.

10. The process of claim 1 wherein said catalyst comprises an aluminosilicate molecular sieve having a silica to alumina molar ratio of about 20 to about 150.

11. The process of claim 1 wherein said catalyst comprises an aluminosilicate molecular sieve having a silica to alumina molar ratio of about 45 to about 90.

12. The process of claim 1 wherein said catalyst comprises a molecular sieve having a Constraint Index of about 1 to about 12.

13. The process of claim 1 wherein said olefinic recycle stream contains no more than 10 wt. % of $C_{10}+$ non-normal olefins.

14. The process of claim 1 wherein said olefinic recycle stream contains no more than 7 wt. % of $C_{10}+$ non-normal olefins.

15. The process of claim 12 wherein said olefinic recycle stream has a final boiling point of no greater than 340° F. (170° C.).

16. The process of claim 1 wherein said olefinic recycle stream contains no more than 30 wt. % of $C_9+$ non-normal olefins.

17. The process of claim 13 wherein said olefinic recycle stream has a final boiling point of no greater than 290° F. (140° C.).

18. The process of claim 1 wherein the hydrocarbon product stream contains between about 3 wt. % and about 25 wt. % of $C_9$ non-normal olefins.

19. The process of claim 1 wherein the hydrocarbon product stream comprises between about 0.5 wt. % and about 12 wt. % of $C_{17}$ to $C_{20}$ hydrocarbons.

20. The process of claim 1 wherein said hydrocarbon product stream has an initial boiling point of at least 260° F. (127° C.).

21. The process of claim 1 and further comprising contacting said hydrocarbon product stream with hydrogen to at least partially saturate the olefins contained therein.

* * * * *